US012792551B2

(12) United States Patent
Das Sharma et al.

(10) Patent No.: US 12,792,551 B2
(45) Date of Patent: Nov. 10, 2026

(54) DIE-TO-DIE INTERCONNECT PROTOCOL LAYER

(71) Applicant: Intel Corporation, Santa Clara, CA (US)

(72) Inventors: Debendra Das Sharma, Saratoga, CA (US); Swadesh Choudhary, Mountain View, CA (US); Narasimha Lanka, Dublin, CA (US); Lakshmipriya Seshan, Sunnyvale, CA (US); Gerald Pasdast, San Jose, CA (US); Zuoguo Wu, San Jose, CA (US)

(73) Assignee: Intel Products IP LLC, Santa Clara, CA (US)

( * ) Notice: Subject to any disclaimer, the term of this patent is extended or adjusted under 35 U.S.C. 154(b) by 0 days.

(21) Appl. No.: 17/853,502

(22) Filed: Jun. 29, 2022

(65) Prior Publication Data

US 2022/0327084 A1 Oct. 13, 2022

Related U.S. Application Data

(60) Provisional application No. 63/295,155, filed on Dec. 30, 2021.

(51) Int. Cl.

| | |
|---|---|
| ***G06F 13/42*** | (2006.01) |
| ***G06F 11/10*** | (2006.01) |
| ***G06F 13/40*** | (2006.01) |

(52) U.S. Cl.

CPC ...... *G06F 13/4221* (2013.01); *G06F 11/1004* (2013.01); *G06F 13/409* (2013.01)

(58) Field of Classification Search

CPC ............ G06F 13/4221; G06F 11/1004; G06F 13/409; G06F 13/4295; H01L 2224/16227; H01L 2225/06513; H01L 2225/06517; H01L 2924/15192; H01L 2924/15313; H01L 25/18

See application file for complete search history.

(56) References Cited

U.S. PATENT DOCUMENTS 11,100,028 B1 * 8/2021 Subramaniam ..... G06F 13/4221
2010/0215055 A1 8/2010 Glaser (Continued)

OTHER PUBLICATIONS

PCT International Search Report and Written Opinion in PCT International Application Serial No. PCT/US2022/080690 mailed on Apr. 12, 2023 (17 page).

(Continued)

*Primary Examiner* — Henry Tsai
*Assistant Examiner* — Kim T Huynh
(74) *Attorney, Agent, or Firm* — Alliance IP, LLC

(57) ABSTRACT

Protocol layer logic in a protocol stack receives an indication that a particular mode is to be utilized on a die-to-die (D2D) link connecting a first device to a second device. The protocol layer logic generates data to be sent on the D2D link to adapt the particular data format to a flit format defined for use on the D2D link in the particular mode, the flit format comprises providing a set of reserved fields to be completed by an adapter block positioned between the protocol circuitry and a physical layer block. The data in the flit format is sent to the data to the adapter block to prepare the data for transmission over the D2D link.

20 Claims, 20 Drawing Sheets

(56) References Cited

U.S. PATENT DOCUMENTS

| | | | | |
|---|---|---|---|---|
| 2013/0205053 | A1* | 8/2013 | Harriman | G06F 13/4295 710/105 |
| 2015/0032917 | A1 | 1/2015 | Nguyen | |
| 2016/0179427 | A1 | 6/2016 | Jen et al. | |
| 2017/0004098 | A1 | 1/2017 | Sharma et al. | |
| 2018/0095923 | A1* | 4/2018 | Iyer | G06F 13/4022 |
| 2019/0065426 | A1 | 2/2019 | Sharma et al. | |
| 2020/0327084 | A1 | 10/2020 | Choudhary et al. | |
| 2020/0327088 | A1 | 10/2020 | Choudhary et al. | |
| 2020/0356436 | A1* | 11/2020 | Iyer | H04L 9/40 |
| 2020/0394150 | A1 | 12/2020 | Lanka et al. | |
| 2021/0117350 | A1* | 4/2021 | Safranek | G06F 13/22 |
| 2021/0232520 | A1* | 7/2021 | Choudhary | G06F 11/048 |
| 2021/0399982 | A1* | 12/2021 | Das Sharma | H04L 49/60 |
| 2022/0012140 | A1 | 1/2022 | Sharma et al. | |
| 2022/0327084 | A1 | 10/2022 | Sharma et al. | |

OTHER PUBLICATIONS

EESR Notice of Extended European Search Report issued in EP Patent Application No. 22917426.3 issued on Nov. 14, 2025 (9 pages).

* cited by examiner

800d

DIE-TO-DIE INTERCONNECT PROTOCOL LAYER

RELATED APPLICATIONS

This application claims benefit to U.S. Provisional Patent Application Ser. No. 63/295,155, filed Dec. 30, 2021, which is incorporated by reference herein in its entirety.

FIELD

This disclosure pertains to computing systems, and in particular (but not exclusively) to physical interconnects and related link protocols.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc.

As a result of the greater ability to fit more processing power in smaller packages, smaller computing devices have increased in popularity. Smartphones, tablets, ultrathin notebooks, and other user equipment have grown exponentially. However, these smaller devices are reliant on servers both for data storage and complex processing that exceeds the form factor. Consequently, the demand in the high-performance computing market (i.e. server space) has also increased. For instance, in modern servers, there is typically not only a single processor with multiple cores, but also multiple physical processors (also referred to as multiple sockets) to increase the computing power. But as the processing power grows along with the number of devices in a computing system, the communication between sockets and other devices becomes more critical.

In fact, interconnects have grown from more traditional multi-drop buses that primarily handled electrical communications to full blown interconnect architectures that facilitate fast communication. Unfortunately, as the demand for future processors to consume at even higher-rates corresponding demand is placed on the capabilities of existing interconnect architectures.

DETAILED DESCRIPTION

Figure 1:
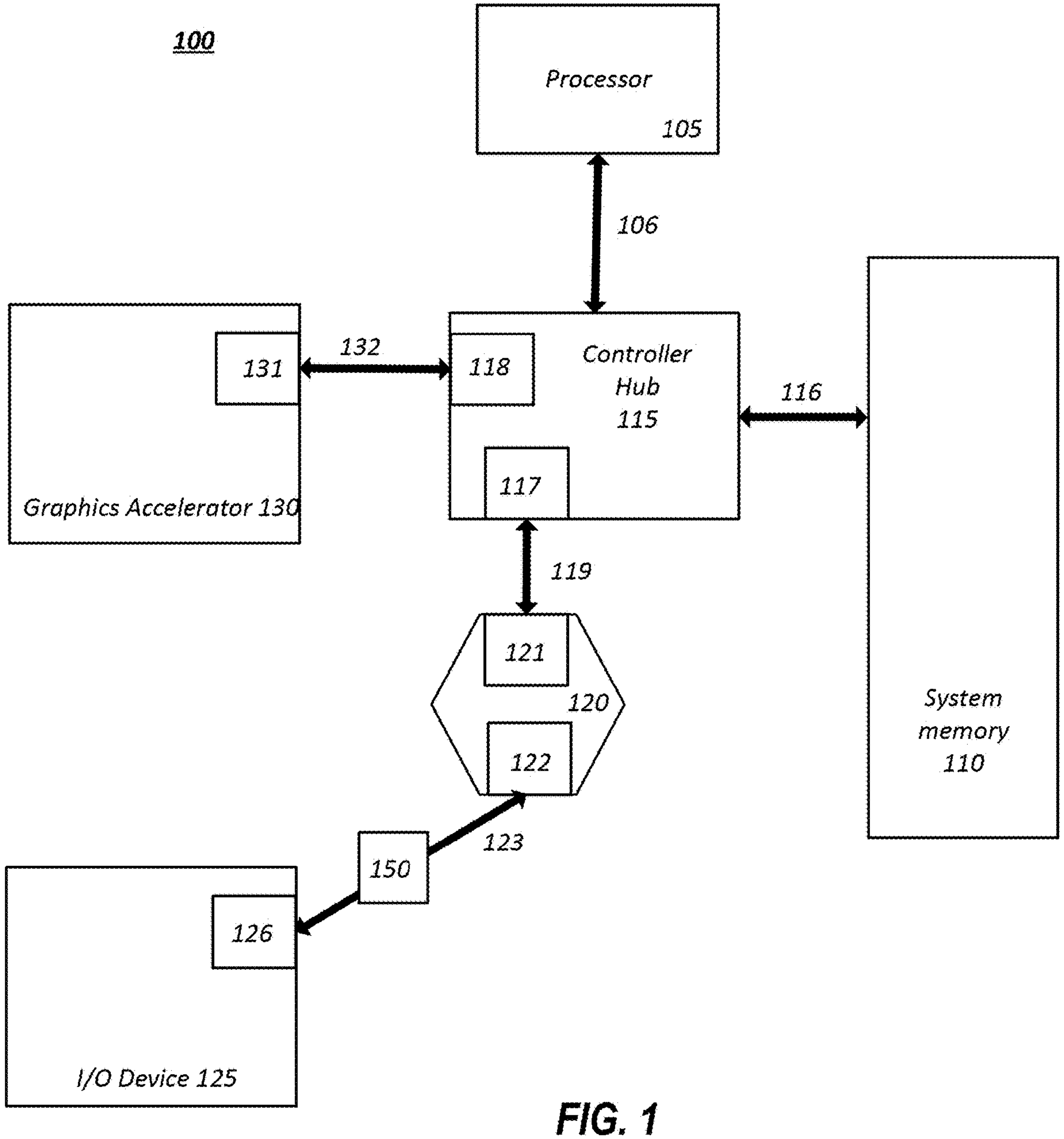
FIG. 1 illustrates an embodiment of a computing system including an interconnect architecture.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the solutions provided in the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to specific integrated circuits, such as in computing platforms or microprocessors, other embodiments are applicable to other types of integrated circuits and logic devices. Similar techniques and teachings of embodiments described herein may be applied to other types of circuits or semiconductor devices. For example, the disclosed embodiments are not limited to desktop computer systems or Ultrabooks™ and may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. The techniques and teachings of embodiments described herein may also be applied at the server level, including rack scale server platforms, blade server platforms, and other server architectures. Moreover, the apparatus', methods, and systems described herein are not limited to physical computing devices, but may also relate to software emulations and simulations of physical systems, such as those architectures discussed in the examples below. As will become readily apparent in the description below, the embodiments of methods, apparatus', and systems described herein (whether in reference to hardware, firmware, software, or a combination thereof) are important in enabling computing platforms to handle increasing data speeds while balancing power usage and physical footprint, among other example considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the solutions described herein.

Modern interconnect fabric architectures enable components and devices from different vendors to inter-operate in an open architecture, spanning multiple market segments; Clients (Desktops and Mobile), Servers (Standard and Enterprise), and Embedded and Communication devices. For instance, high performance, general purpose I/O interconnect protocols (e.g., Peripheral Component Interconnect Express (PCIe)) have been defined for a wide variety of future computing and communication platforms. Such protocols and corresponding architectures may take advantage of advances in point-to-point interconnects, switch-based technology, and packetized protocol to deliver new levels of performance and features. As an example, Power Management, Quality Of Service (QoS), Hot-Plug/Hot-Swap support, Data Integrity, and Error Handling are among some of the advanced features supported by PCI Express.

Referring to FIG. 1, an embodiment of a fabric composed of point-to-point Links that interconnect a set of components is illustrated. System 100 includes processor 105 and system memory 110 coupled to controller hub 115. Processor 105 includes any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard. Interconnect protocols and features discussed below may be utilized to implement the fabric and links coupling the set of components introduced here in FIG. 1.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 may be implemented as a root hub, root complex, or root controller in a PCIe interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a PCIe to PCI/PCI-X bridge to support legacy or other version PCI devices. Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105. Further, one or more links (e.g., 123) of the system can include one or more extension devices (e.g., 150), such as retimers, repeaters, etc.

Figure 2:
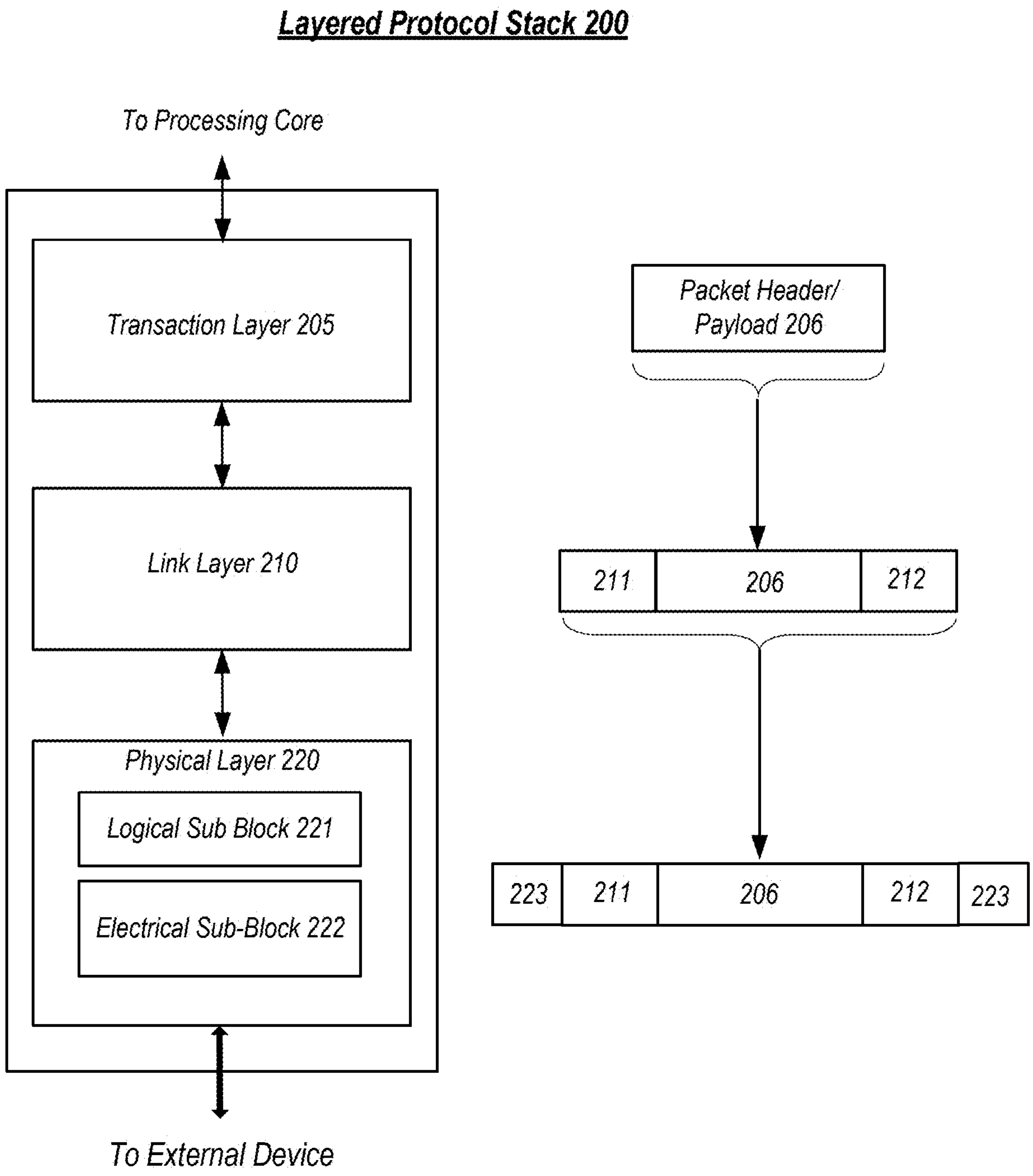
FIG. 2 illustrates an embodiment of a interconnect architecture including a layered stack.

Turning to FIG. 2 an embodiment of a layered protocol stack is illustrated. Layered protocol stack 200 includes any form of a layered communication stack, such as a Quick Path Interconnect (QPI) stack, a PCIe stack, a Compute Express Link (CXL) stack, or other high performance computing interconnect stack, or other layered stack. Although the discussion immediately below in reference to FIGS. 1-4 are in relation to a general purpose interconnect protocol stack (e.g., PCIe), the same concepts may be applied to other interconnect stacks. In one embodiment, protocol stack 200 is a protocol stack including transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

A protocol may use packets to communicate information between components. Packets are formed in the Transaction Layer 205 and Data Link Layer 210 to carry the information from the transmitting component to the receiving component. As the transmitted packets flow through the other layers, they are extended with additional information necessary to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). The translation layer 205 typically manages credit-base flow control for TLPs. For instance, a protocol may implement split transactions, i.e. transactions with request and response separated by time, allowing a link to carry other traffic while the target device gathers data for the response. In some implementations, flow control may be implemented using a credit-based flow control scheme. In this scheme, a device advertises an initial amount of credit for each of the receive buffers in Transaction Layer 205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the devices supporting the protocol. Transactions to the configuration space include read requests and write requests. Message space transactions (or, simply messages) are defined to support in-band communication between protocol agents implementing the protocols on the devices. Therefore, in one embodiment, transaction layer 205 assembles packet header/payload 206.

Link Layer

Link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

Physical Layer

In one embodiment, physical layer 220 includes logical sub block 221 and electrical sub-block 222 to physically transmit a packet to an external device. Here, logical sub-block 221 is responsible for the "digital" functions of Physical Layer 221. In this regard, the logical sub-block includes a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to physical transmission medium connecting the transmitter to another external device. The receiver is supplied with serialized symbols from an external device and transforms the received signals into a bit-stream. The bit-stream is de-serialized and supplied to logical sub-block 221. In one embodiment, an 8 b/10 b transmission code is employed, where ten-bit symbols are transmitted/received. In other instances, a 128 b/130 b encoding may be employed, while in still other implementations, flit-based transmission may be utilized, among other examples. In one example, special symbols are used to frame a packet with frames 223. In addition, in one example, the receiver also provides a symbol clock recovered from the incoming serial stream.

A transmission medium may implement a transmission path for transmitting data, such as a transmission line, a copper line, an optical line, a wireless communication channel, an infrared communication link, or other communication path. A connection between two devices, is referred to as a link. A link may be implemented using one or multiple constituent transmission paths, or lanes. To scale bandwidth, a link may aggregate multiple lanes denoted by xN, where N is any supported Link width, such as 1, 2, 4, 8, 12, 16, 32, 64, or wider. In some implementations, differential signaling may be employed, with a differential pair referring to two transmission paths to transmit differential signals. As an example, in a differential pair, when a first line in the pair toggles from a low voltage level to a high voltage level, i.e. a rising edge, the other line in the pair drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

As stated above, although transaction layer 205, link layer 210, and physical layer 220 are discussed in reference to a specific embodiment (e.g., a traditional PCIe protocol stack), a layered protocol stack is not so limited. In fact, any layered protocol may be included/implemented. As an example, an port/interface may include logic implemented in hardware circuitry and/or firmware to implement various layers in a layered protocol, such as: (1) a first layer to assemble packets (e.g., a transaction or protocol layer); a second layer to sequence packets (e.g., a link or data link layer); and a third layer to transmit the packets (e.g., a physical layer), including layers of protocols discussed more particularly below.

In some implementations, interconnect protocols may implement cache-coherent links. As one example, Ultra Path Interconnect™ (UPI™) may be utilized in high performance computing platforms, such as workstations or servers, including in systems where PCIe or another interconnect protocol is typically used to connect processors, accelerators, I/O devices, and the like. However, UPI is not so limited. Instead, UPI may be utilized in any of the systems or platforms described herein. Furthermore, the individual ideas developed may be applied to other interconnects and platforms, such as PCIe, MIPI, QPI, etc.

Figure 3:
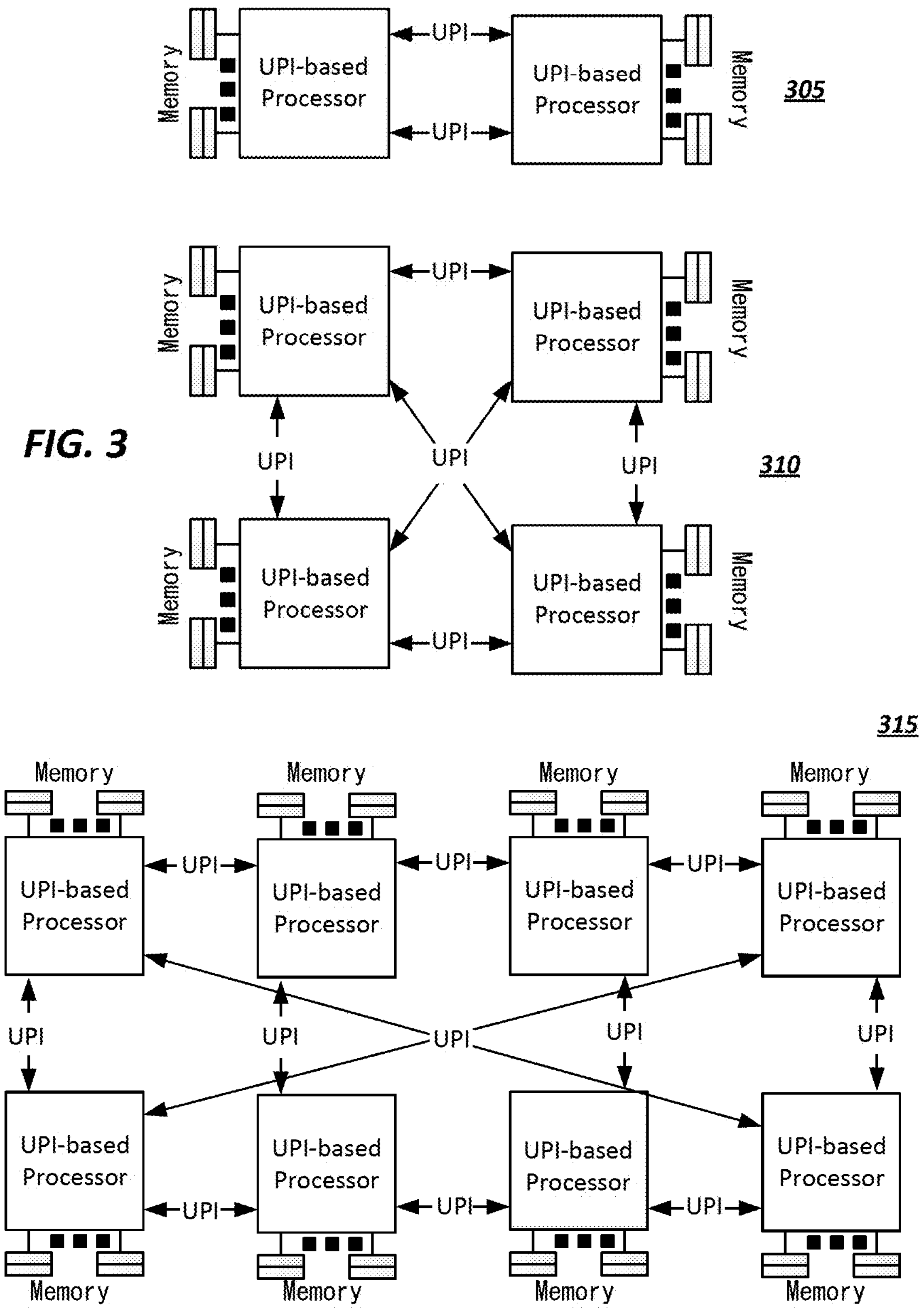
FIG. 3 illustrates embodiments of potential high performance, processor-to-processor interconnect configurations.

To support multiple devices, in one example implementation, UPI can be Instruction Set Architecture (ISA) agnostic (i.e. UPI is able to be implemented in multiple different devices). In another scenario, UPI may also be utilized to connect high performance I/O devices, not just processors or accelerators. For example, a high performance PCIe device may be coupled to UPI through an appropriate translation bridge (i.e. UPI to PCIe). Moreover, the UPI links may be utilized by many UPI based devices, such as processors, in various ways (e.g. stars, rings, meshes, etc.). Indeed, interconnect protocols, such as UPI and others discussed herein, may be used to facilitate interconnections between dies or packages. For instance, FIG. 3 illustrates example implementations of various potential multi-socket configurations. A two-socket configuration 305, as depicted, can include two links; however, in other implementations, one link may be utilized. For larger topologies, any configuration may be utilized as long as an identifier (ID) is assignable and there is some form of virtual path, among other additional or substitute features. As shown, in one example, a four socket configuration 310 has a link from each processor to another. But in the eight socket implementation shown in configuration 315, not every socket is directly connected to each other through a respective link. However, if a virtual path or channel exists between the processors, the configuration is supported. A range of supported processors includes 2-32 in a native domain. Higher numbers of processors may be reached through use of multiple domains or other interconnects between node controllers, among other examples.

As with other interconnect architectures, the UPI architecture includes a definition of a layered protocol architecture, including in some examples, protocol layers (coherent, non-coherent, and, optionally, other memory based protocols), a routing layer, a link layer, and a physical layer. In some implementations, respective layers in the protocol stack may construct and/or deal with their own level of granularity or quantum of information (e.g., the protocol layer with packets, the link layer with flits, the physical layer with phits or symbols, among other examples) Note that a packet, in some embodiments, may include partial flits, a single flit, or multiple flits based on the implementation.

In another example interconnect protocol, a Compute Express Link (CXL) interconnect protocol may be utilized to provide an improved, high-speed CPU-to-device and CPU-to-memory interconnect designed to accelerate next-generation data center performance, among other application. CXL maintains memory coherency between the CPU memory space and memory on attached devices, which allows resource sharing for higher performance, reduced software stack complexity, and lower overall system cost, among other example advantages. CXL enables communication between host processors (e.g., CPUs) and a set of workload accelerators (e.g., graphics processing units (GPUs), field programmable gate array (FPGA) devices, tensor and vector processor units, machine learning accelerators, purpose-built accelerator solutions, among other examples). Indeed, CXL is designed to provide a standard interface for high-speed communications, as accelerators are increasingly used to complement CPUs in support of emerging computing applications such as artificial intelligence, machine learning and other applications.

A CXL link may be a low-latency, high-bandwidth discrete or on-package link that supports dynamic protocol multiplexing of coherency, memory access, and input/output (I/O) protocols. Among other applications, a CXL link may enable an accelerator to access system memory as a caching agent and/or host system memory, among other examples. CXL is a dynamic multi-protocol technology designed to support a vast spectrum of accelerators. CXL provides a rich set of protocols that include I/O semantics similar to PCIe (CXL.io), caching protocol semantics (CXL.cache), and memory access semantics (CXL.mem) over a discrete or on-package link. Based on the particular accelerator usage model, all of the CXL protocols or only a subset of the protocols may be enabled. In some implementations, CXL may be built upon the well-established, widely adopted PCIe infrastructure (e.g., PCIe 5.0), leveraging the PCIe physical and electrical interface to provide advanced protocol in areas include I/O, memory protocol (e.g., allowing a host processor to share memory with an accelerator device), and coherency interface.

Figure 4:
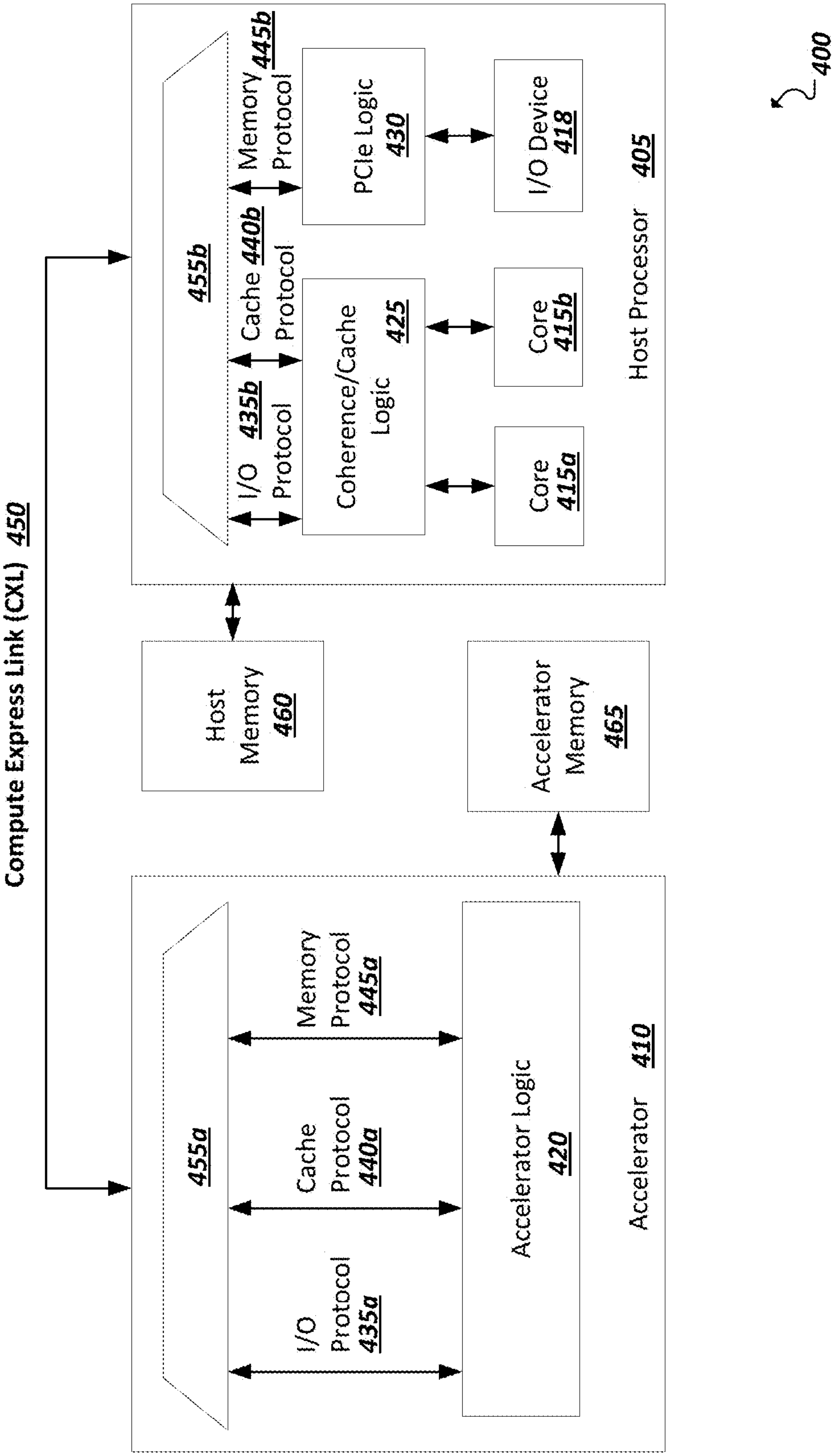
FIG. 4 illustrates an embodiment of a layered protocol stack associated with an interconnect.

Turning to FIG. 4, a simplified block diagram 400 is shown illustrating an example system utilizing a CXL link 450. For instance, the link 450 may interconnect a host processor 405 (e.g., CPU) to an accelerator device 410. In this example, the host processor 405 includes one or more processor cores (e.g., 415*a-b*) and one or more I/O devices (e.g., 418). Host memory (e.g., 460) may be provided with the host processor (e.g., on the same package or die). The accelerator device 410 may include accelerator logic 420 and, in some implementations, may include its own memory (e.g., accelerator memory 465). In this example, the host processor 405 may include circuitry to implement coherence/cache logic 425 and interconnect logic (e.g., PCIe logic 430). CXL multiplexing logic (e.g., 455*a-b*) may also be provided to enable multiplexing of CXL protocols (e.g., I/O protocol 435*a-b* (e.g., CXL.io), caching protocol 440*a-b* (e.g., CXL.cache), and memory access protocol 445*a-b* (CXL.mem)), thereby enabling data of any one of the supported protocols (e.g., 435*a-b*, 440*a-b*, 445*a-b*) to be sent, in a multiplexed manner, over the link 450 between host processor 405 and accelerator device 410.

In some implementations of CXL, a Flex Bus' port may be utilized in concert with CXL-compliant links to flexibly adapt a device to interconnect with a wide variety of other devices (e.g., other processor devices, accelerators, switches, memory devices, etc.). A Flex Bus port is a flexible high-speed port that is statically configured to support either a PCIe or CXL link (and potentially also links of other protocols and architectures). A Flex Bus port allows designs to choose between providing native PCIe protocol or CXL over a high-bandwidth, off-package link. Selection of the protocol applied at the port may happen during boot time via auto negotiation and be based on the device that is plugged into the slot. Flex Bus uses PCIe electricals, making it compatible with PCIe retimers, and adheres to standard PCIe form factors for an add-in card.

Figure 5:
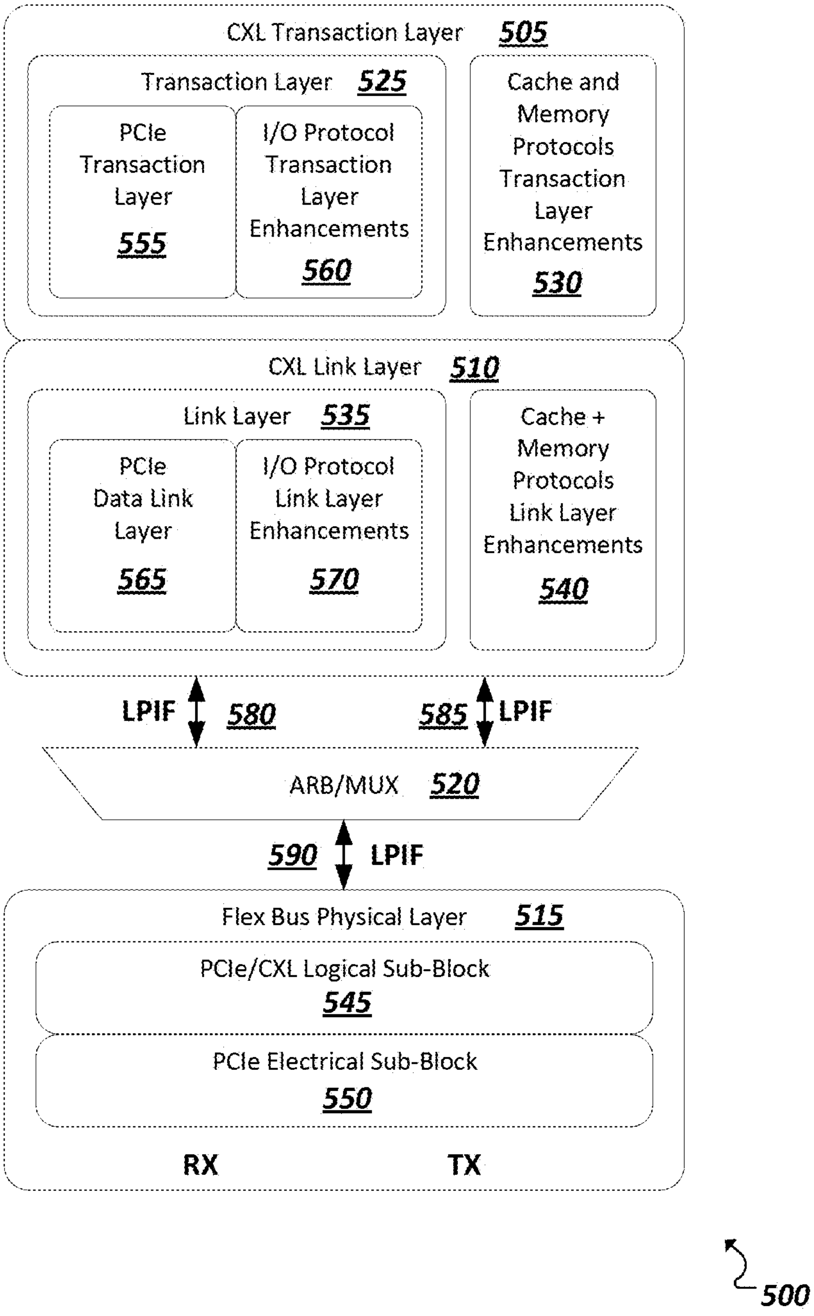
FIG. 5 illustrates a simplified block diagram of an example computing system utilizing a link compliant with a Compute Express Link (CXL)-based protocol.

FIG. 5 is a simplified block diagram illustrating an example port architecture 500 (e.g., Flex Bus) utilized to implement CXL links. For instance, Flex Bus architecture may be organized as multiple layers to implement the multiple protocols supported by the port. For instance, the port may include transaction layer logic (e.g., 505), link layer logic (e.g., 510), and physical layer logic (e.g., 515) (e.g., implemented all or in-part in circuitry). For instance, a transaction (or protocol) layer (e.g., 505) may be subdivided into transaction layer logic 525 that implements a PCIe transaction layer 555 and CXL transaction layer enhancements 560 (for CXL.io) of a base PCIe transaction layer 555, and logic 530 to implement cache (e.g., CXL-.cache) and memory (e.g., CXL.mem) protocols for a CXL link. Similarly, link layer logic 535 may be provided to implement a base PCIe data link layer 565 and a CXL link layer (for CXl.io) representing an enhanced version of the PCIe data link layer 565. A CXL link layer 510 may also include cache and memory link layer enhancement logic 540 (e.g., for CXL.cache and CXL.mem).

Continuing with the example of FIG. 5, a CXL link layer logic 510 may interface with CXL arbitration/multiplexing (ARB/MUX) logic 520, which interleaves the traffic from the two logic streams (e.g., PCIe/CXL.io and CXL.cache/CXL.mem), among other example implementations. During link training, the transaction and link layers are configured to operate in either PCIe mode or CXL mode. In some instances, a host CPU may support implementation of either PCIe or CXL mode, while other devices, such as accelerators, may only support CXL mode, among other examples. In some implementations, the port (e.g., a Flex Bus port) may utilize a physical layer 515 based on a PCIe physical layer (e.g., PCIe electrical PHY 550). For instance, a Flex Bus physical layer may be implemented as a converged logical physical layer 545 that can operate in either PCIe mode or CXL mode based on results of alternate mode negotiation during the link training process. In some implementations, the physical layer may support multiple signaling rates (e.g., 8 GT/s, 16 GT/s, 32 GT/s, etc.) and multiple link widths (e.g., ×16, ×8, ×4, ×2, ×1, etc.). In PCIe mode, links implemented by the port 500 may be fully compliant with native PCIe features (e.g., as defined in the PCIe specification), while in CXL mode, the link supports all features defined for CXL. Accordingly, a Flex Bus port may provide a point-to-point interconnect that can transmit native PCIe protocol data or dynamic multi-protocol CXL data to provide I/O, coherency, and memory protocols, over PCIe electricals, among other examples.

The CXL I/O protocol, CXL.io, provides a non-coherent load/store interface for I/O devices. Transaction types, transaction packet formatting, credit-based flow control, virtual channel management, and transaction ordering rules in CXL.io may follow all or a portion of the PCIe definition. CXL cache coherency protocol, CXL.cache, defines the interactions between the device and host as a number of requests that each have at least one associated response message and sometimes a data transfer. The interface consists of three channels in each direction: Request, Response, and Data.

The CXL memory protocol, CXL.mem, is a transactional interface between the processor and memory and uses the physical and link layers of CXL when communicating across dies. CXL.mem can be used for multiple different memory attach options including when a memory controller is located in the host CPU, when the memory controller is within an accelerator device, or when the memory controller is moved to a memory buffer chip, among other examples. CXL.mem may be applied to transaction involving different memory types (e.g., volatile, persistent, etc.) and configurations (e.g., flat, hierarchical, etc.), among other example features. In some implementations, a coherency engine of the host processor may interface with memory using CXL.mem requests and responses. In this configuration, the CPU coherency engine is regarded as the CXL.mem Master and the Mem device is regarded as the CXL.mem Subordinate. The CXL.mem Master is the agent which is responsible for sourcing CXL.mem requests (e.g., reads, writes, etc.) and a CXL.mem Subordinate is the agent which is responsible for responding to CXL.mem requests (e.g., data, completions, etc.). When the Subordinate is an accelerator, CXL.mem protocol assumes the presence of a device coherency engine (DCOH). This agent is assumed to be responsible for implementing coherency related functions such as snooping of device caches based on CXL.mem commands and update of metadata fields. In implementations, where metadata is supported by device-attached memory, it can be used by the host to implement a coarse snoop filter for CPU sockets, among other example uses.

In some implementations, an interface may be provided to couple circuitry or other logic (e.g., an intellectual property (IP) block or other hardware element) implementing a link layer (e.g., 510) to circuitry or other logic (e.g., an IP block or other hardware element) implementing at least a portion of a physical layer (e.g., 515) of a protocol. For instance, an interface based on a Logical PHY Interface (LPIF) specification to define a common interface between a link layer controller, module, or other logic and a module implementing a logical physical layer ("logical PHY" or "logPHY") to facilitate interoperability, design and validation re-use between one or more link layers and a physical layer for an interface to a physical interconnect, such as in the example of FIG. 5. Additionally, as in the example of FIG. 5, an interface may be implemented with logic (e.g., 535, 540) to simultaneously implement and support multiple protocols. Further, in such implementations, an arbitration and multiplexer layer (e.g., 520) may be provided between the link layer (e.g., 510) and the physical layer (e.g., 515). In some implementations, each block (e.g., 515, 520, 535, 540) in the multiple protocol implementation may interface with the other block via an independent LPIF interface (e.g., 580, 585, 990). In cases where bifurcation is supported, each bifurcated port may likewise have its own independent LPIF interface, among other examples.

While examples discussed herein may reference the use of LPIF-based link layer-logical PHY interfaces, it should be appreciated that the details and principles discussed herein may be equally applied to non-LPIF interfaces. Likewise, while some examples may reference the use of common link layer-logical PHY interfaces to couple a PHY to controllers implement CXL or PCIe, other link layer protocols may also make use of such interfaces. Similarly, while some references may be made to Flex Bus physical layers, other physical layer logic may likewise be employed in some implementations and make use of common link layer-logical PHY interfaces, such as discussed herein, among other example variations that are within the scope of the present disclosure.

Traditional die-to-die interconnects are either vendor-specific or application specific (e.g., HBM Connect is used to connect memory on-package). Some die-to-die interconnects (e.g., MB from Intel, HBI and BoW from OCP consortium) only define a physical layer and do not provide a mechanism for ensuring interoperability across dies. Indeed, current solutions do not exist for implementing a general-purpose die-to-die interconnect that can be used for seamless interoperability between dies and can provide open innovation slots on the package, which engineers can innovate around. An improved interconnect architecture is introduced herein to implement a standardized die-to-die interface through the Universal Chiplet Interconnect Express (UCIe) protocol. Not only does UCIe enable a solution for general-purpose die-to-die interconnects for the on-package and off-package coupling of dies, but the standardization of the interface enable the interconnection of different devices from different vendors and different fabs across different technology nodes using different packaging choices to improve upon existing computing system and implement new systems.

UCIe offers high-bandwidth, low-latency, power-efficient, and cost-effective on-package connectivity between chiplets. It addresses the projected growing demands of compute, memory, storage, and connectivity across the entire compute continuum spanning cloud, edge, enterprise, 5G, automotive, high-performance computing, and hand-held segments. While Moore's Law has held true, allowing for increasingly compact and powerful computing blocks, the increasing on-package integration of multiple dies in mainstream commercial offerings such as client CPUs, server CPUs, GP-GPUs, etc. has resulted in larger die sizes to meet growing performance demands. This phenomenon, however, has resulted in designs running running up against the die reticle limit. Examples include multi-core CPUs with core count in the hundreds or very large fanout switches. Even when a die can fit within the reticle limit, multiple smaller dies connected in a package may be preferable for yield optimization as well as die reuse across multiple market segments. On-package connectivity of identical dies enables these scale-up applications. Additionally, chiplet integration on package also enables a designer to make different trade-offs for different market segments by choosing different numbers and types of dies. For example, one can choose different numbers of compute, memory, and I/O dies depending on the need of the segment. One does not need to do a different die design for different segments, resulting in lower product SKU cost.

On-package integration of chiplets enables a fast and cost-effective way to provide bespoke solutions. For example, different usages may need different acceleration capability but with the same cores, memory, and I/O. It also allows the co-packaging of dies where the optimal process node choice is made based on the functionality. For example, memory, logic, analog, and co-packaged optics each needs a different process technology which can be packaged with chiplets. Since package traces are short and offers dense routing, applications requiring high bandwidth such as memory access (e.g., High Bandwidth Memory), are implemented as on-package integration.

UCIe is an open, multi-protocol capable, on-package interconnect standard for connecting multiple dies on the same package. UCIe enables the development of a vibrant ecosystem supporting disaggregated die architectures which can be interconnected using UCIe. UCIe may support multiple underlying protocols provided by various protocol layer blocks which may be utilized in connection with UCIe, such as PCIe, CXL, Advanced Extensible Interface™ (AXI), UPI, and other others, as well as a raw mode that can be used to map any protocol of choice (as long as both link partners support it) on top of a common physical and link layer. UCIe may additionally encompass the elements for system on chip (SoC) construction, such as the application layer and the form-factors relevant to the package (e.g., bump location, power delivery, thermal solution, etc.), among other features. The features of UCIe act to ensure interoperability across a wide range of devices having different performance characteristics. A well-defined debug and compliance mechanism is provided to ensure interoperability. UCIe may additionally allow support of devices in a backward compatible manner.

While UCIe supports a wide range of usage models, a subset are provided here as illustrative examples. As noted above, some protocols may be mapped explicitly onto UCIe, such as PCIe and CXL. Such protocols may be mapped onto a UCIe flit format, including the raw mode. As an example, widely used protocols such as PCIe and CXL may be mapped onto UCIe to more on-package integration, for instance, by replacing the PCIe SERDES PHY and the PCIe/CXL Logical PHY along with the link level retry, improve power, and enhance performance, among other example features. UCIe raw mode is protocol-agnostic and enables other protocols to be mapped ad hoc by a device, while allowing usages such as integrating a stand-alone SERDES/transceiver tile (e.g., ethernet) on-package, among other example features.

Figure 6:
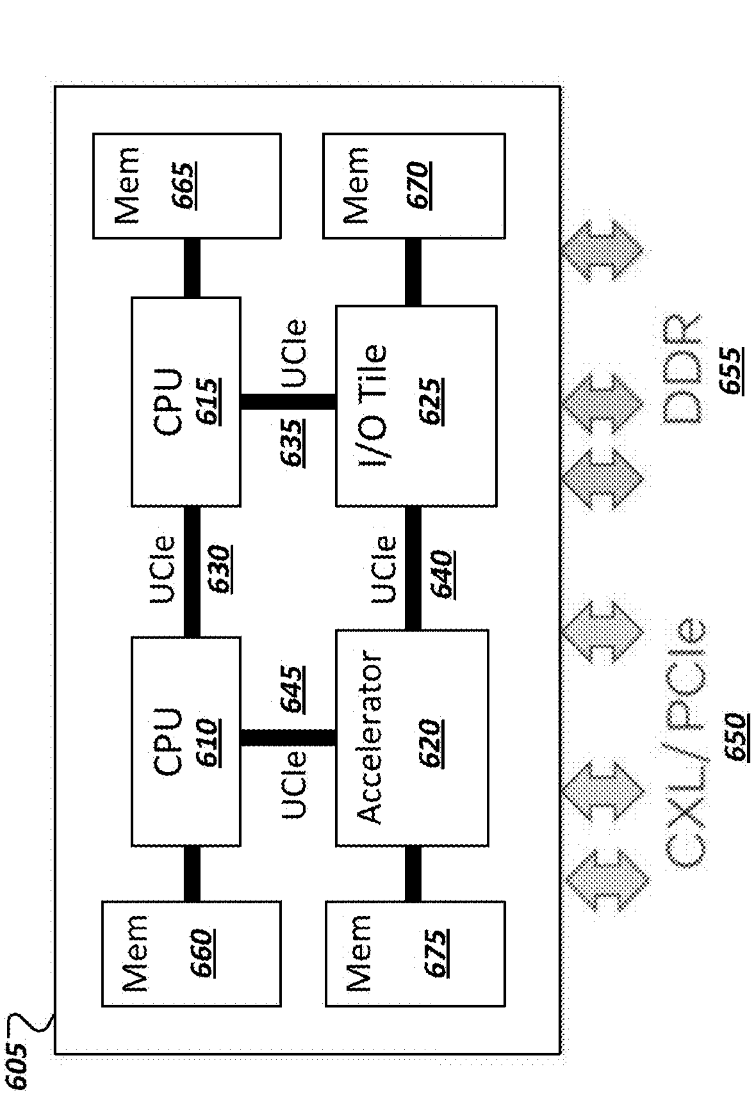
FIG. 6 illustrates a simplified block diagram of an example system on chip (SoC) package.

FIG. 6 is a simplified block diagram 600 illustrating an example implementation of an SoC package 605 including a number of processor dies (e.g., 610, 615), accelerator die(s) (e.g., 620), and input/output (I/O) tiles (e.g., 625) interconnected using a number of UCIe links (e.g., 630, 635, 640, 645). In some implementations, an accelerator 620 and/or I/O tile 625 can be connected to CPU device(s) 610, 615 using CXL transactions running on UCIe to thereby leverage the I/O, coherency, and memory protocols of CXL. The I/O tile can provide the external CXL, PCIe and DDR pins (e.g., 650, 655) of the package 605. The accelerator can also be connected to the CPU using PCIe transactions running on UCIe. The CPU-to-CPU connectivity on-package can also use the UCIe interconnect, running coherency protocols, among other examples. In some implementations, all component on an example SoC package may be interconnected using UCIe links. In other instances, one or more blocks (e.g., memory blocks 660, 665, 670, 675) may be connected using other protocols or links (e.g., DDR, etc.), among other example implementations.

Figure 7:
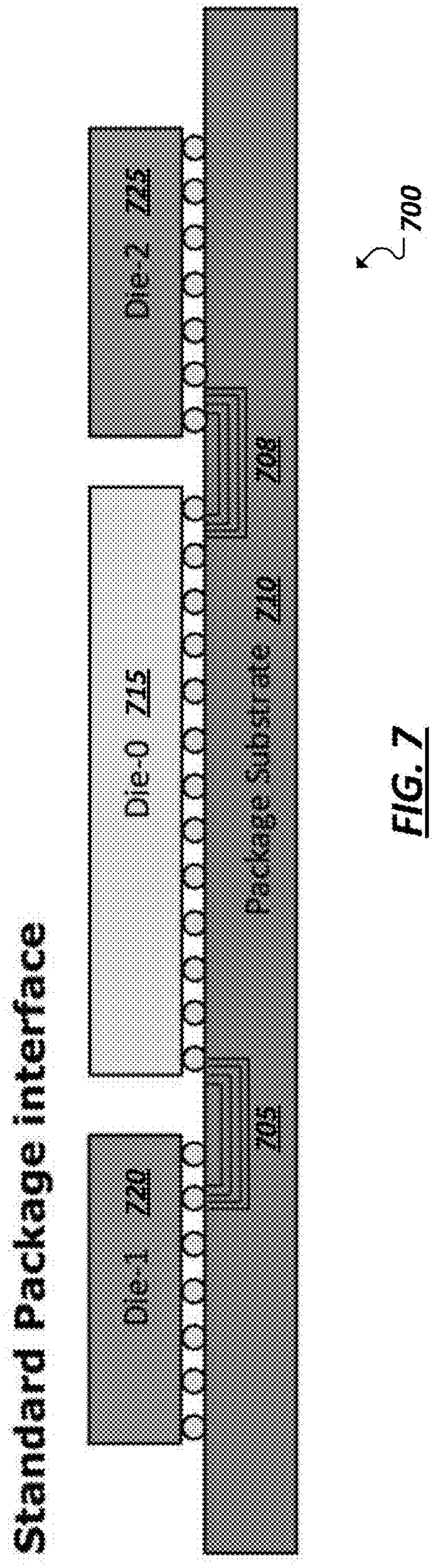
FIG. 7 illustrates simplified block diagram of a two-dimensional package substrate and interconnect coupling two or more device.

A variety of packages may support UCIe links. For instance, a standard two-dimensional (2D) package may be utilized, as well 2.5D and 3D advanced packaging options, among other examples. FIG. 7 is a simplified block diagram illustrating an example application using a standard 2D package. A 2D package may be used for low cost and long reach (e.g., 10 mm to 25 mm) interconnects using traces 705, 708 on organic package/substrate 710, while still providing significantly better BER characteristics compared to off-package SERDES. As shown in FIG. 7, a first die 715 may be coupled to a second die 720 and a third die 725 by respective links implemented using traces (e.g., 705, 708) on the substrate 710.

Figure 8A:
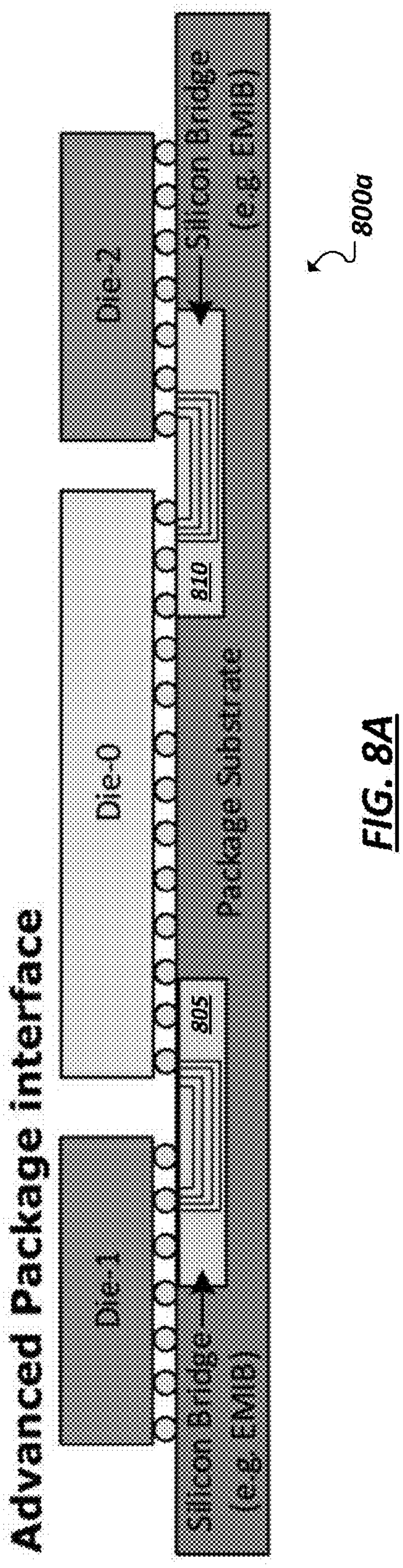
FIGS. 8A-8D illustrates simplified block diagram of example package configurations.
Figure 8B:
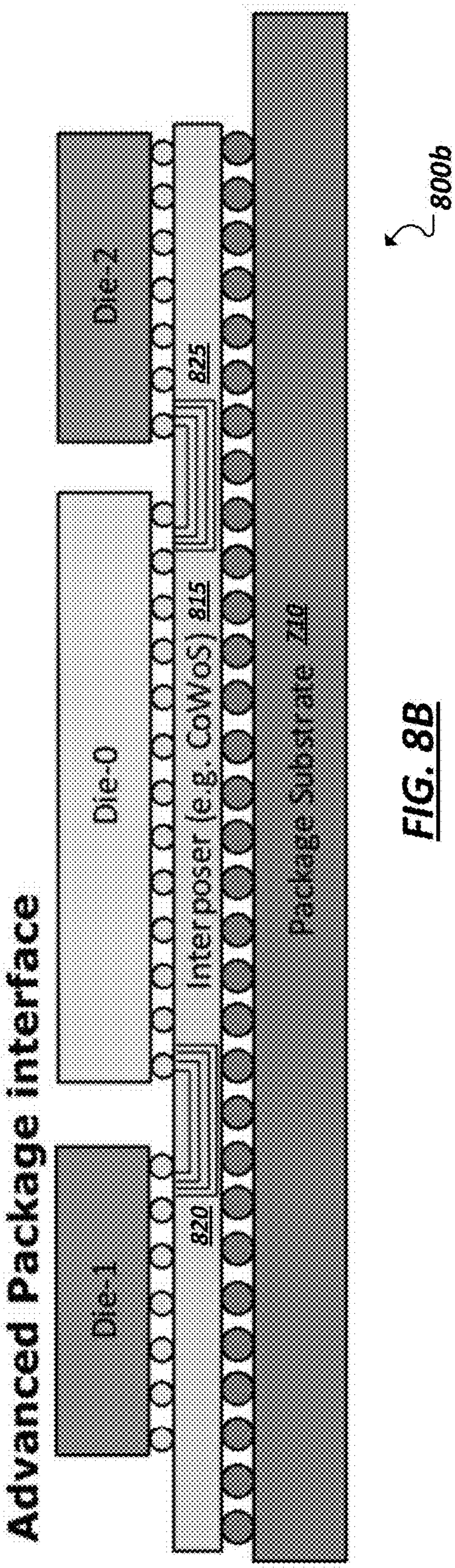
Figure 8C:
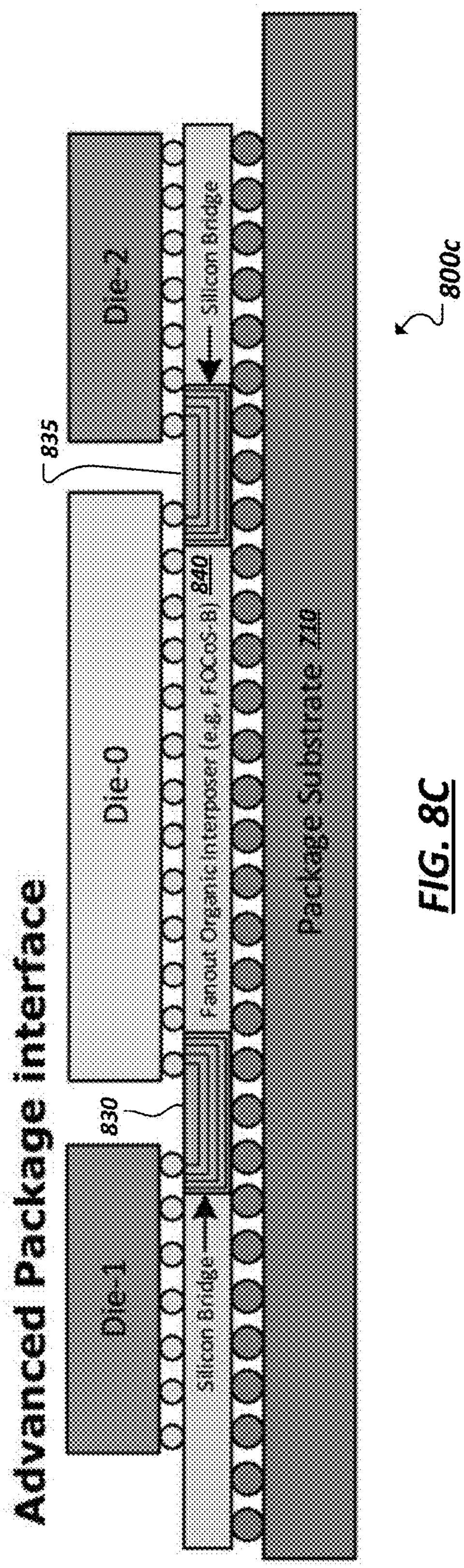

FIGS. 8A-8D are simplified block diagrams 800*a-d* showing example applications using a UCIe advanced (e.g., 2D) option. Such packaging technology may be used for performance optimized applications. Consequently, the channel reach is short (e.g., less than 2 mm) and the interconnect is expected to be optimized for high bandwidth and low latency with best performance and power efficiency characteristics. In one example, shown in FIG. 8A, links may be implemented on a silicon bridge 805, 810 (e.g., an Embedded Multi-die Interconnect Bridge (EMIB)). In the example of FIG. 8B, an interposer 815 on the package 710 and UCIe links (e.g., 820, 825) may be provided on the interposer 815

Figure 8D:
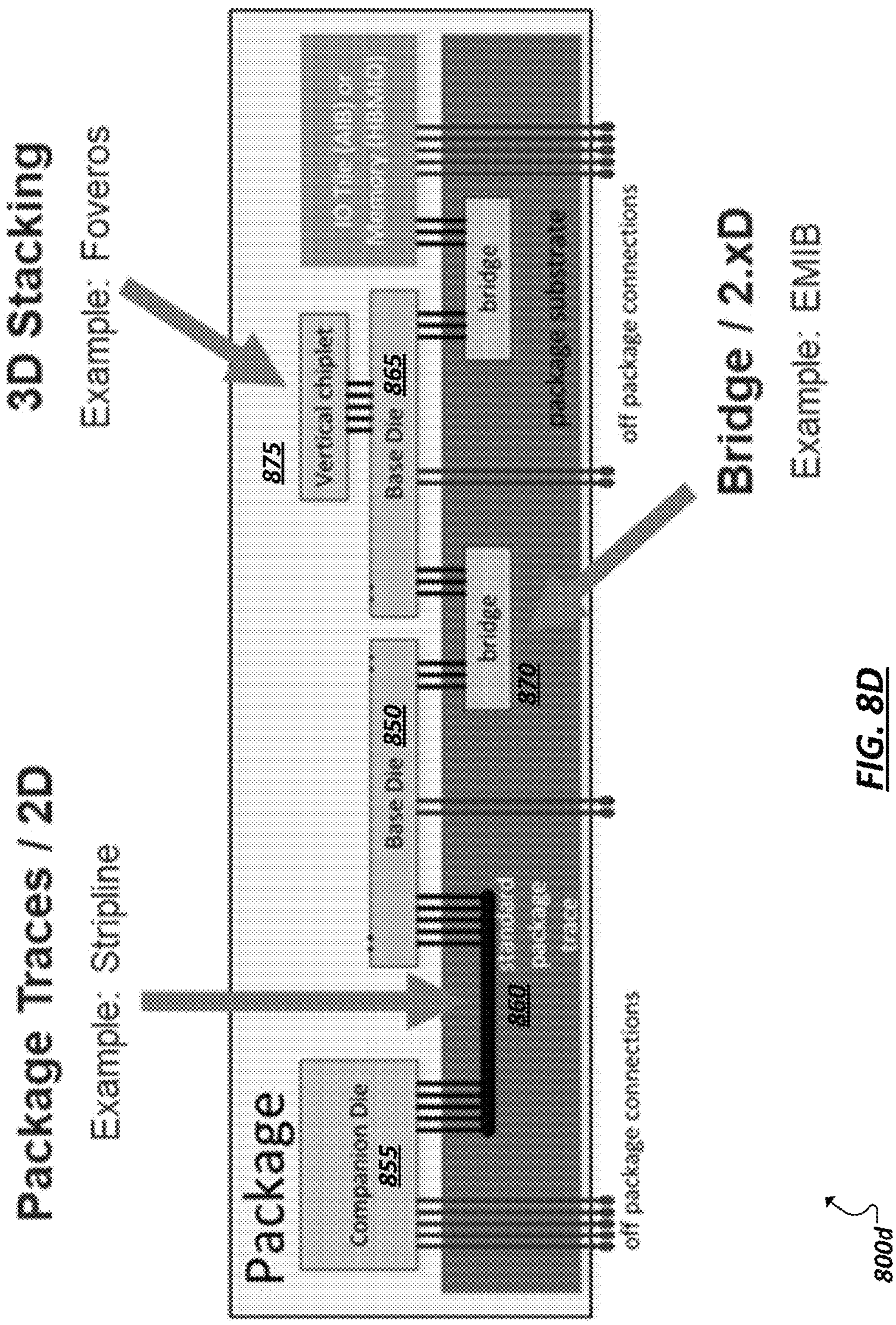

(e.g., in a Chip-on-Wafer-on-Substrate (CoWoS) application). In still another example of an advanced package, shown in FIG. 8C, silicon bridges (e.g., 830, 835) may be provided in a fanout organic interposer 840 which is provided on the package 710, and UCIe link may be implemented in the silicon bridges 830, 835. FIG. 8D shows another example in which a combination of standard and advanced options are employed. For instance, a base die 850 may be coupled to a companion die 855 in a 2D manner by a first link utilizing a standard package trace 860, while the base die 850 is coupled to another base die 865 by a bridge-based link 870. In another example, base die 865 couples via a 3D UCIe link to a vertical chiplet 875, among other example architectures and package applications.

Figure 9:
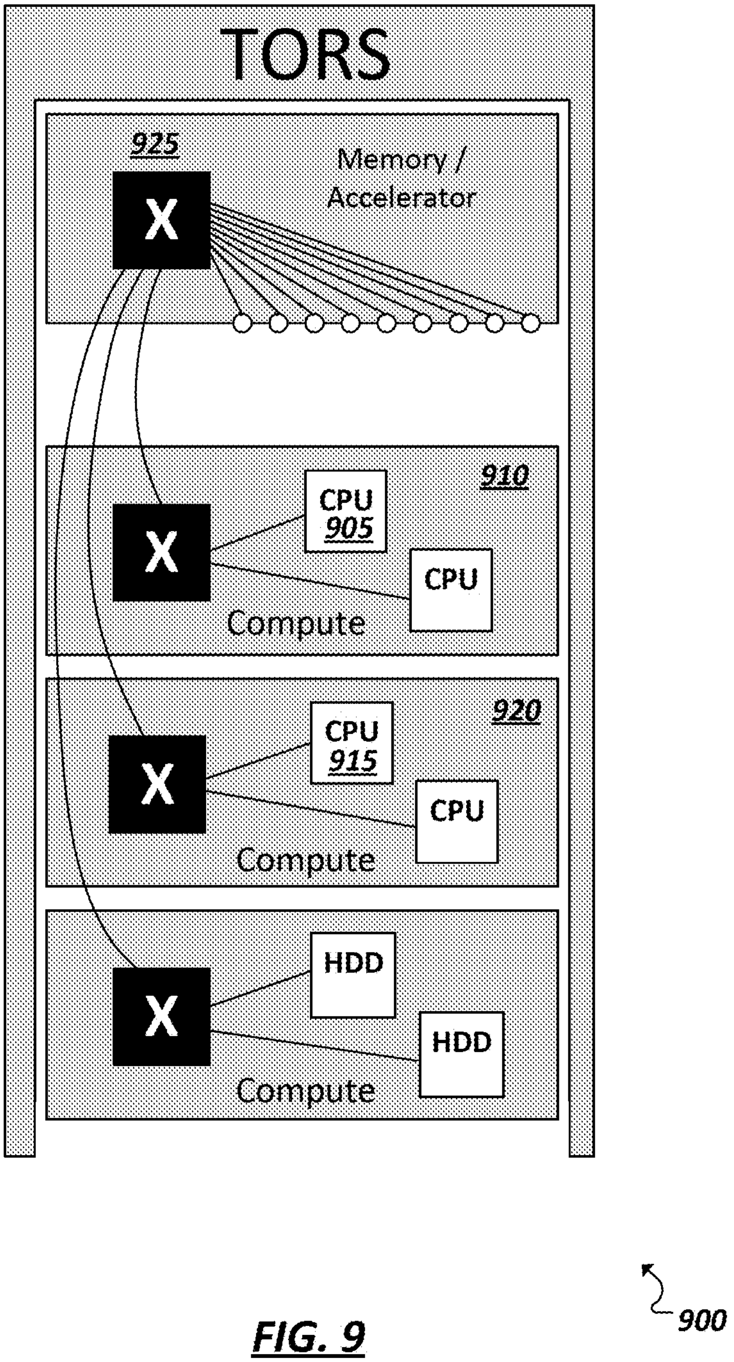
FIG. 9 is a simplified block diagram illustrating an example rack server with interconnected computing devices using a Universal Chiplet Interconnect Express (UCIe)-based protocol.

UCIe supports two broad usage models. The first usage model, as introduced above, involves package level integration to deliver power-efficient and cost-effective performance. Accordingly, components attached at the board level such as memory, accelerators, networking devices, modem, etc. can be integrated at the package level with applicability from hand-held to high-end servers with dies from multiple sources connected through different packaging options even on the same package. The second usage is to provide off-package connectivity using different types of media (e.g., optical, electrical cable, mmWave) using UCIe retimers to transport the underlying protocols (e.g., PCIe, CXL) at the rack or even the pod level for enabling resource pooling, resource sharing, and even message passing using load-store semantics beyond the node level to the rack/pod level to derive better power-efficient and cost-effective performance at the edge and data centers. FIG. 9 is a simplified block diagram showing an example rack server system (e.g., UCIe may be utilized to facilitate off-package connections, including server-scale interconnections between devices. In such implementations, retimers may be provided (e.g., a top of rack server (TORS)) on-package) to facilitate off-package connections. For instance, off-package UCIe links may be utilized to couple a device (e.g., processor device 905) on a first chassis 910 to another device (e.g., processor 915) on another second chassis 920 (e.g., via a switch device 925), among other example implementations.

Figure 10:
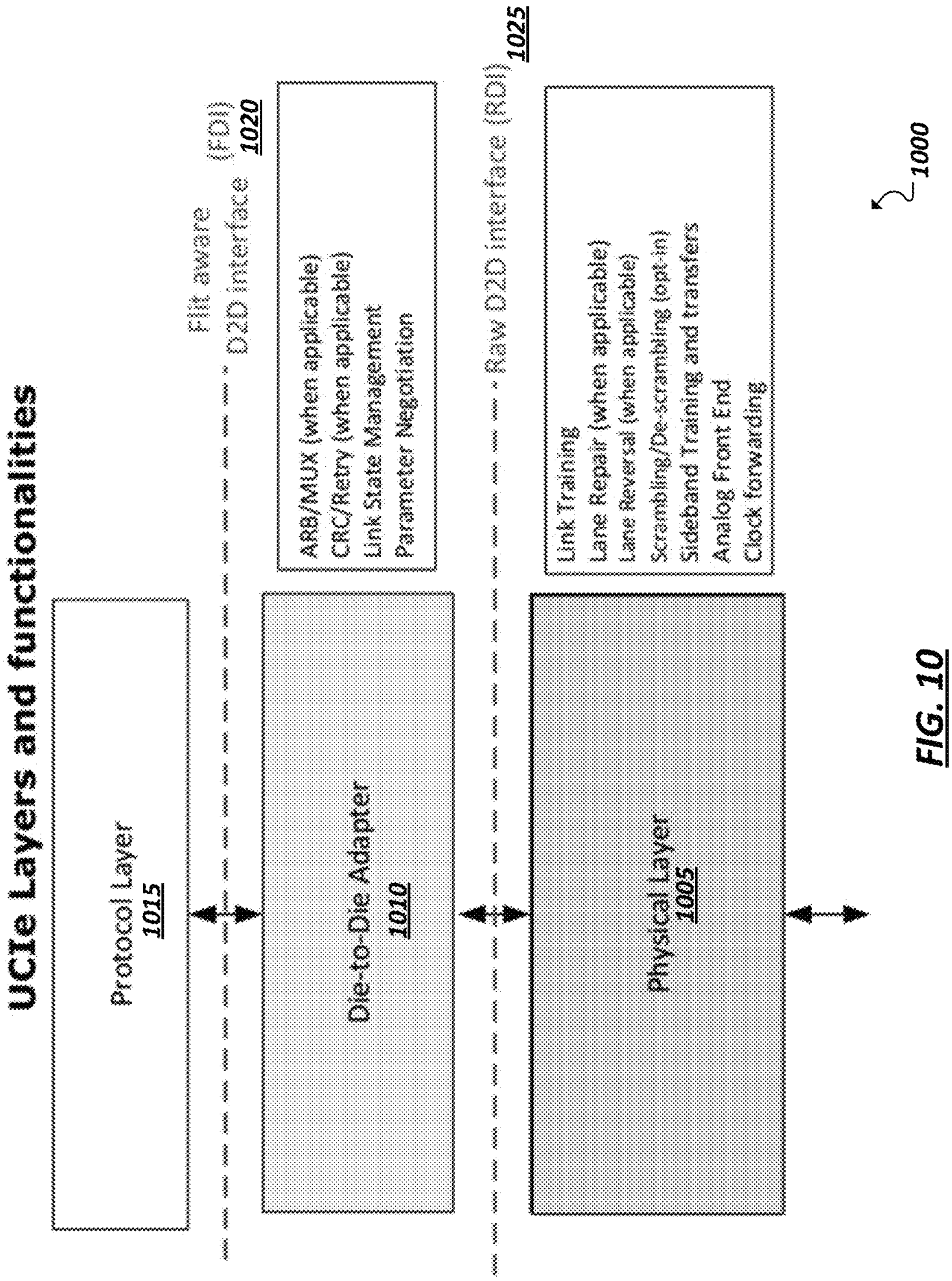
FIG. 10 is a simplified block diagram illustrating an example protocol stack of UCIe.

UCIe is a layered protocol, as illustrated in the block diagram 1000 of FIG. 10. The physical layer 1005 is responsible for the electrical signaling, clocking, link training, and sideband signaling. A die-to-die (D2D) adapter block 1010 provides the link state management and parameter negotiation for the chiplets. It optionally guarantees reliable delivery of data through its cyclic redundancy check (CRC) and link level retry mechanism. When multiple protocols are supported, the D2D adapter defines the underlying arbitration framework for arbitrating between data of the multiple protocols on the link. In one example implementation, UCIe may provide a 256-byte flit (or flow control unit) to define the underlying transfer mechanism when the adapter is responsible for reliable transfer. As noted above, one or more other interconnect protocols may be natively mapped to the flit format of UCIe. In one example, UCIe maps PCIe and CXL protocols to ensure seamless interoperability by leveraging the existing ecosystems of these protocols. For instance, with PCIe and CXL, SoC construction, link management, and security solutions that are already deployed can be leveraged to UCIe. The usage models addressed are also comprehensive: data transfer using direct memory access, software discovery, error handling, etc., are addressed with PCIe/CXL.io; the memory use cases are handled through CXL.Mem; and caching requirements for applications such as accelerators are addressed with CXL.cache, among other example benefits and use cases. UCIe also defines a "streaming protocol" which can be used to map any other protocol onto the flit format(s) defined in UCIe.

A protocol layer 1015 may be according to potentially any interconnect protocol, including protocols natively mapped to UCIe (e.g., CXL, PCIe, etc.), other well-defined or standardized interconnect protocols which can make use of UCIe's streaming or raw modes, or proprietary or vendor-defined protocols (which may likewise make use of UCIe's streaming or raw mode. The protocol layer may implement a transaction layer of the corresponding protocol, implement flow control schemes defined in the protocol, among other protocol-specific features. A logic block implementing the protocol layer 1015 (e.g., in software, firmware, and/or hardware) may interface with a UCIe D2D adapter 1010 using a flit-aware D2D interface (or FDI) 1020. The FDI interface may be defined in the UCIe protocol specification and define a set of signals for communication and negotiation between the protocol layer block 1015 and D2D adapter block 1010. For instance, signals or messages may defined in the FDI 1020 whereby the D2D adapter 1010 informs the protocol layer (e.g., based on a negotiation with a link partner device (e.g., the D2D adapter of the link partner device)) the flit format to be utilized (e.g., a mapped flit format, streaming mode flit format, raw mode flit format, etc.), which the protocol layer 1015 may use to adapt data of the corresponding protocol for the identified flit format, among other examples.

Through the provision of streaming and raw modes, UCIe allows the option of transporting data of any protocol on a UCIe link. Protocol data can be transported in flit formats, or as raw fabric wires if needed. Some protocols may be explicitly mapped, allowing for on-board components such as accelerators, memory expanders, and I/O expanders to be moved on-package seamlessly. Flit modes include operating modes where error detection and/or error correction bits/bytes (e.g., CRC) are inserted into a defined flit format by the D2D adapter. Flit modes include operating modes where a flit of another, underlying protocol of the data (e.g., PCIe, UPI, CXL, GenZ, AXI, etc.) is mapped onto the UCIe flit format, as well as a streaming mode (where data of potentially any other protocol is encoded or populated into the flit format (e.g., which includes the CRC and any other designated fields defined in the UCIe flit)). Raw mode, on the other hand, is an operating mode where all bytes of the UCIe flit are populated by the protocol layer (and the D2D adapter accepts the flit as-is without adding CRC, Retry, or other values into the flit and transfers data from the protocol layer to the physical layer without any modification). In some instances, CRC, Retry, FEC, etc. in raw mode may be handled entirely by the protocol layer (rather than the UCIe D2D adapter), among other examples.

In some implementations, a D2D adapter 1010 may be provided as a distinct block of circuitry (e.g., from that implementing the protocol layer block and/or the physical layer block 1005). In other implementations, one or both of the logic implementing of the protocol layer or the physical layer may be collocated or integrated with the logic (e.g., hardware circuitry) implementing the D2D adapter block 1010, among other example implementations. A D2D adapter 1010 coordinates with the protocol layer 1015 (e.g., via FDI 1020) and the physical layer 1005 (e.g., via raw D2D interface (RDI) 1025) to ensure successful data transfer across a UCIe link. Providing such standardized interfaces (e.g., FDI and RDI) to couple blocks (e.g., IP blocks) implementing respective layers of the protocol allows vendors and SoC builders to easily mix and match different layers from different IP providers at low integration cost and faster time to market. (e.g., enabling a Protocol Layer block to work with the D2D Adapter and Physical Layer block from any different vendor that conforms to the interface handshakes provided in this specification). Further, given that interoperability testing during post-silicon has greater overhead and cost associated with it, a consistent understanding and development of Bus Functional Models (BFMs) based on such interfaces may allow easier IP development for such UCIe protocol stack implementations, among other example benefits.

The D2D adapter 1010 helps facilitate the minimization of logic in the main data path to realize a highly latency-optimized data path for protocol flits. The D2D adapter may include logic to implement various functionality that may be leveraged by various protocols (of protocol layer 1015), such arbitration and multiplexor functionality, error detection and/or error correction codes (e.g., cyclic redundancy check (CRC)), retry scheme, among other example features. As an example, a protocol layer implementing CXL may be coupled to a D2D adapter. When transporting CXL protocol, the ARB/MUX functionality of the D2D adapter 1010 may be utilized to perform arbitration/multiplexing of the multiple sub-protocols of CXL (e.g., CXL.mem, CXL.io, CXL.cache). Error detection, error correction, retry, and other functionality provided by the D2D adapter 1010 may be utilized to support targeted bit error rate (BER) requirements (e.g., based on the speed to be implemented on the link). For instance, where the raw BER is less than 1e-27, a CRC and retry scheme may be provided by the D2D adapter 1010. Additionally, the D2D adapter 1010 may be responsible for coordinating higher level link state machine and link bring up protocols, protocol options related to parameter exchanges with remote link partner, and when supported, power management coordination with remote link partner. For instance, two link partner devices to be coupled using a UCIe link may utilize their respective D2D adapters to perform training of the link (e.g., through the progression through various link states defined in a link state machine) and determination of parameters to be used during operation of the link, among other examples.

A communication port of a computing device may be constructed from a protocol logic block, a D2D adapter block, and a physical layer block. The protocol logic block may interface with the D2D adapter block via a FDI interface and the D2D adapter may interface with the physical layer block using an RDI interface. Each of the FDI and RDI interfaces may be implemented using physical pins, traces, conductors, or other communication pathways, over which the respective signals of the defined interface may be communicated. The protocol logic block (e.g., 1015), D2D adapter block (e.g., 1010), and physical layer block (e.g., 1015) implement respective layers of the UCIe protocol and enable their device to establish a UCIe-compliant link and communicate with another link partner computing device using the UCIe protocol.

The physical layer of a UCIe stack may be implemented through a number of physical layer modules to form the physical layer of a corresponding link. The module forms the main data path (e.g., on the physical bumps or pins of the port) and is organized as a grouping of lanes. A module forms the atomic granularity for the structural design implementation of UCIe's analog front end (AFE). The number of lanes per module may be based on whether a Standard or Advanced package is utilized in the implementations. A single D2D adapter may be coupled to a physical layer implemented as one or multiple modules (for bandwidth scaling). The physical link (and each module making up the physical layer) of UCIe may include a sideband connection (made up of a first subset of the lanes) and a mainband connection made up of a second subset of the lanes of the physical layer). The mainband connection of a UCIe module/physical layer provide the main data path in UCIe. The mainband connection may include a forwarded clock, a data valid pin, and N data lanes per module. The sideband connection is used for parameter exchanges, register accesses for debug/compliance, and coordination with remote partner for link training and management. The sideband connection may include a forwarded clock pin and a data pin in each direction. In one example implementation, a forwarded clock may be fixed at a frequency of 800 MHz regardless of the main data path speed (e.g., at a different frequency than the main data path (mainband) speed). In some implementations, the sideband logic for UCIe's physical layer may be powered using auxiliary power to place the sideband logic in an "always on" domain. Each module may include its own respective set of sideband pins/bumps/lanes.

As noted above, the protocol layer logic of a port may interface with a D2D adapter via a standardized interface (e.g., FDI). The D2D adapter 1010 may manage the training of a UCIe link through communications with the corresponding D2D adapter of the link partner device on the end of the link. Through the training, various configurations and capabilities of the devices may be shared and determined, such that the interoperability of the devices is established. Further, characteristics of the physical layer communication channel may be determined during training, including the bit error rate (BER) and other metrics related to the speed and reliability of the channel. Based on the determined characteristics of the link partner devices and the physical interconnection between them, the D2D adapters may determine the appropriate data format (e.g., flit format) to use in communications between the two devices, based on the underlying data protocol (e.g., PCIe, USB, CXL, Gen-Z, AXI, UPI, etc.) negotiated for use in the communications over the UCIe link. Once the data format, or operating mode, is negotiated, each D2D adapter may communicate with its respective protocol layer block (e.g., 1015) over FDI 1020 to indicate to the protocol layer 1015 how data is to be delivered to the D2D adapter (e.g., 1010) from the protocol layer to facilitate the data formats associated with the mode of operation.

The protocol layer 1015 is to implement one or more particular underlying protocols (e.g., PCIe, USB, CXL, Gen-Z, AXI, UPI, etc.). For each protocol, UCIe may support multiple modes of operation and the D2D adapters of the link partners may likewise negotiate not only the underlying protocol to use, but also the particular mode of operation of that protocol based on the advertised capabilities, physical layer status, as well as usage models (e.g., on-package, off-package optical, off-package mmWave, etc.). These operating modes may have different associated flit formats, which are defined to enable different trade-offs around efficiency, bandwidth and interoperability. The spectrum of supported protocols, advertised modes and flit formats may be determined at system (e.g., system on chip (SoC)) integration time or during the die-specific reset bring up flow. The D2D adapter 1010 uses this information to negotiate the operational mode as a part of link training and informs the protocol layer over the FDI 1020.

As introduced above, one or more defined data (e.g., flit) formats may be explicitly mapped to a UCIe flit format and utilized by the protocol layer 1015 when this data format is negotiated for use (e.g., by the D2D adapter). For instance, in one example implementation, PCIe 6.0, CXL 2.0, and CXL 3.0 protocols may be mapped to UCIe. In such an implementation, any PCIe device that does not support the flit mode defined in PCIe 6.0+ can still use the CXL.io subprotocol of CXL 2.0 which converts PCIe to a flit mode. Potentially any protocol may be mapped explicitly to a UCIe flit format. Further, when explicit mapping has not been defined for a protocol, any other protocol map be mapped ad hoc through a streaming protocol, when both sides use the same mapping mechanism and have negotiated this other protocol (e.g., using the sideband negotiation).

For protocols which are mapped explicitly, multiple mappings may be provided based on the characteristics negotiated for the link. For instance, a protocol's mapping may include the use of raw mode (where the protocol wires or flits are mapped as-is), which is useful for connecting two devices on different packages using an external interconnect medium such as copper, optical, mmWave etc. For example, when UCIe is used to connect devices that are on different packages (e.g., devices connected through co-packaged optics or another transmission path), a raw mode of mapping may be used. The raw mode uses the underlying error detection, error correct, and replay mechanism of the protocol layer (rather than those provided in the UCIe D2D adapter). For instance, such protocol layer mechanisms may be provided in the underlying on-board or intra-rack interconnect protocol (e.g., PCIe/CXL) that has to deal with a much higher bit-error rate (BER) arising from the interpackage usage model (as compared with the more optimized error detection/correction mechanism of UCIe which may assume better BER characteristics for on-package die-to-die links).

Further, a protocol's mapping may include the mapping of specialized optimized versions of the protocols, such as latency-optimized flit formats defined in the underlying protocol (e.g., PCIe, CXL, etc.). For instance, with optimized mapping, better bandwidth efficiency may be achieved than in the underlying PCIe and CXL protocols as the flits may use UCIe's native error detection and recovery mechanism (e.g., provided through the D2D adapter) using spare wires, among other examples. In one example implementation, the optimized mode mapping (e.g., for both PCIe and CXL) may be used with the advanced packaging option, for the usage model where both devices are on the same package and where two (or more) spare lanes are available (e.g., for use in lane repair). As an example, the underlying PCIe and CXL flits may be enhanced in such instances so that transactions occupy the entire 256 B of the UCIe flit, while link layer protocol information, such as data link layer packet, credit, ACK/NAK, sequence number fields are removed and carried, instead, using the spare lanes of the advanced package. Such spare lanes may be assumed to carry a much smaller payload for such functionality using UCIe's efficient reliable delivery protocol. This results in a more efficient link.

The protocol layer block 1015 (e.g., implemented in hardware and/or software) is responsible for transmitting data to the D2D adapter 1010 (over FDI 1020) in accordance with the negotiated mode and flit format. For illustrative purposes, several examples are provided below to show example flit formats as may be constructed by the protocol layer block 1015 based on the results of the link training negotiated communicated to the protocol layer 1015 by the D2D adapter 1010. These examples are shown using an example configuration of a 64 B data path mapped to a 64 lane physical layer data module, although other data path widths may be utilized in other implementations. Certain flit formats have dedicated byte positions filled in by the D2D adapter. In such instances, the protocol layer may generate a flit with these byte positions, or fields, reserved for later population by the D2D adapter, before the flit is passed on for transmission on the physical layer.

Figure 11A:
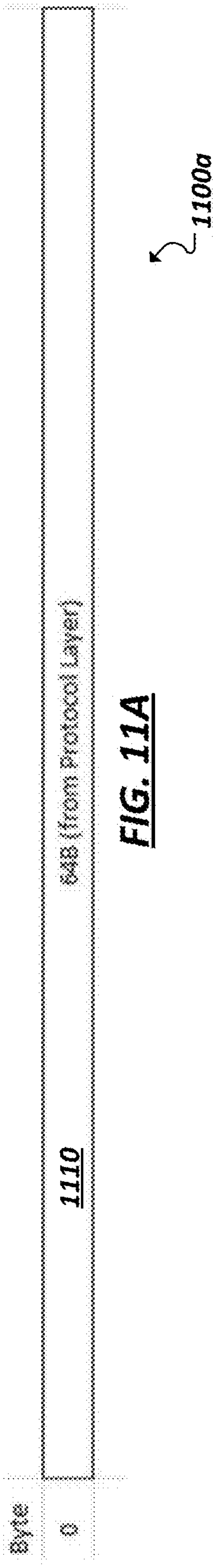
FIGS. 11A-11B are representations of example data mappings for use by a protocol layer block within an example raw mode.
Figure 11B:
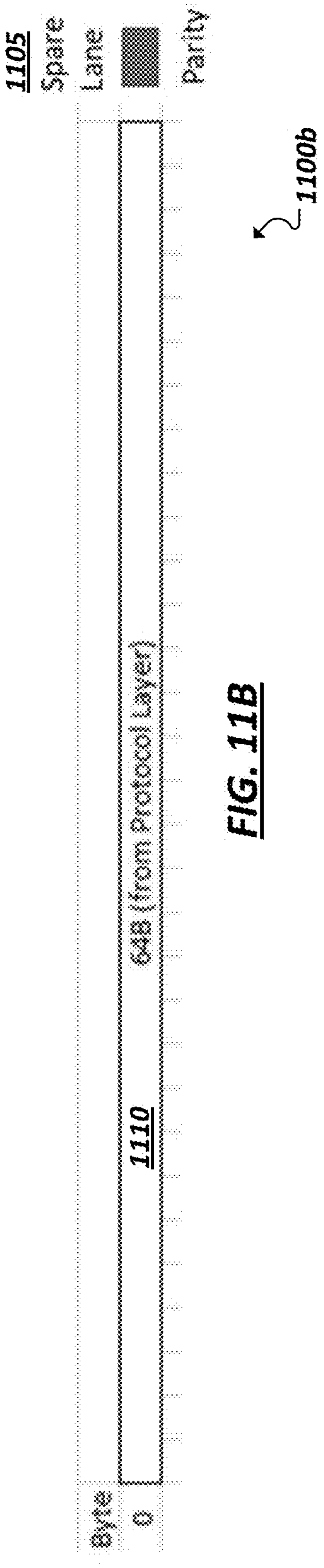

Turning to FIGS. 11A-11B, example formats are shown for data generated by a protocol layer block for a D2D adapter in a raw mode. As above, the raw mode may permit effectively any type, protocol, or format of data to be transmitted on a UCIe link. To the extent CRC, FEC, Retry, or any other features are to be employed in raw mode, the protocol layers (of the link partners) are to implement these independent of the D2D adapter. Accordingly, in a raw mode, the D2D adapter may be expected to pass the data received from the protocol layer block as-is to the PHY and no fields reserved for the D2D adapter may be present in the data generated by the protocol layer block. FIG. 11A shows a standard raw mode format **1100*a* where all 64 bytes of the transmission medium are defined by the protocol layer. FIG. 11B shows an example of a raw mode data format 1100*b* where one or more extra or spare lanes are available to extend the width of the transmission path beyond 64 bytes. These spare lanes (e.g., 1105) may then be utilized to send parity data or other information. While the protocol layer may be solely responsible for providing data in the main-band lanes (e.g., 1110), in the case of advanced package configurations enabling the use of spare lanes (as in the example of FIG. 11B), information sent on the spare lane may be generated by the D2D adapter, such as parity or other error correction information. In one example, additional parity information sent on a spare lane 1105** may include 1 B of parity for every 8 UI of data transferred across the physical link. If parity is not enabled, or if spare lanes are not available to transmit parity, the D2D adapter can check and count CRC errors used by the underlying PCIe or CXL protocols to help characterize the D2D link (which can especially be useful for the optical connections to characterize or debug the link which is the dominant source of errors), among other example features and functionality, which may be added by the D2D adapter even when the link is operating in raw mode.

In the case of PCIe 6.0 or CXL operating in raw mode (as negotiated by the D2D adapter), a 256 B flit defined in the underlying protocol (PCIe or CXL) may be mapped as-is onto the UCIe wires, byte-by-byte. As such, the 64 B block 1110 illustrated FIGS. 11A-11B would correspond to a 64 B segment of the 256 B flit. In the case of CXL 2.0, the 68 B flit may be mapped to 64 B, but shifted over time. For raw mode implementations of PCIe and CXL, retry, CRC, and FEC may be handled using the PCIe or CXL features implemented on the protocol layer. In CXL implementations of raw mode, for the CXL.mem and CXL.cache subprotocols, viral or poison containment may also be handled by the protocol layer. As noted above, raw mode operation in PCIe or CXL may be particularly advantageous in off-package usage models (suing UCIe retimers). An example usage of this mode may include a CPU and an I/O device on different racks/chasses and connected through a UCIe retimer using an off-package interconnect (such as in the example of FIG. 9). In off-package use cases, UCIe retimers may be equipped with logic to check and count errors using included in the data (and populated by the protocol layer), such as the parity bits of the 6 B FEC or the flit mode 8 B CRC defined in PCIe, to enable the retimer to also monitor and play a role in characterizing the quality of the die-to-die link (e.g., in order to characterize or debug the link, which may be the dominant source of errors).

Figure 12A:
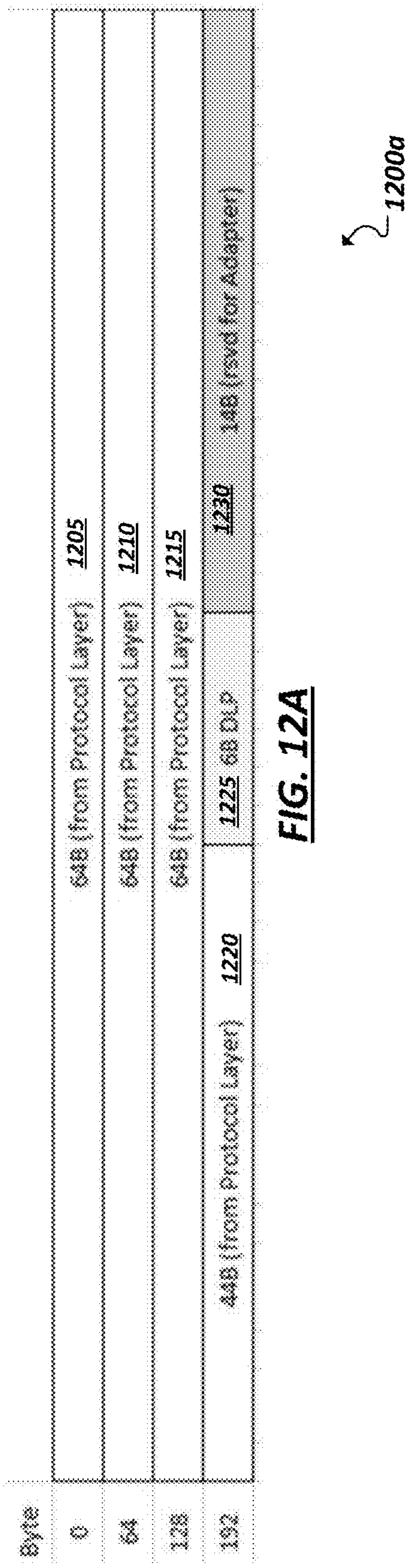
FIGS. 12A-12B are representations of example data mappings for use by a protocol layer block to map flits of a Peripheral Component Interconnect Express (PCIe)-based protocol.
Figure 12B:
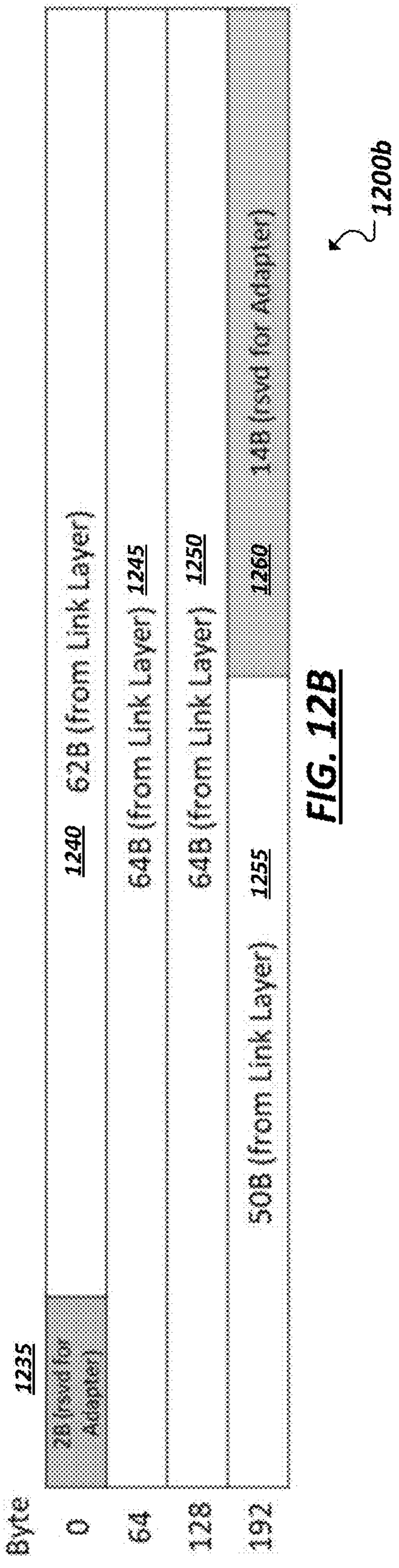

In addition to raw mode, a mapping of PCIe or CXL, as the underlying protocol in UCIe, may be further mapped in a standard flit mode or one or more optimized modes. In some implementations, when a protocol is explicitly mapped, the standard mode may be considered mandatory in order for a protocol layer to advertise the capability, while other modes (e.g., raw, optimized, etc.) may be considered optional, among other example implementations (e.g., where other modes are also considered mandatory for interoperability guarantees). As one example, protocol layer blocks supporting PCIe 6.0 (as defined in the PCI Express Base Specification Revision 6.0) may be utilized in a UCIe protocol stack and the flits defined in PCIe may be mapped to UCIe flits. For instance, FIGS. 12A-12B illustrate example implementations of mappings 1200*a-b* of a PCIe flit mode flit onto a 256 UCIe flit in a standard mode. In a first example, the first 236 B of the flit (1205, 1210, 1215, 1220) are populated by the protocol layer with PCIe flit data, followed by 6 B of data link packet (DLP) data 1225, which may be provided by either the protocol layer or the D2D adapter depending on the application. In some implementations, power management and link management DLLPs defined in PCIe are omitted from the DLP data 1225 (in light of services provided by the D2D adapter). Other PCIe DLLPs (that are applicable for PCIe flit mode) and flit status definitions may be included and follow the same rules including packing as defined in PCIe.

Figure 14:
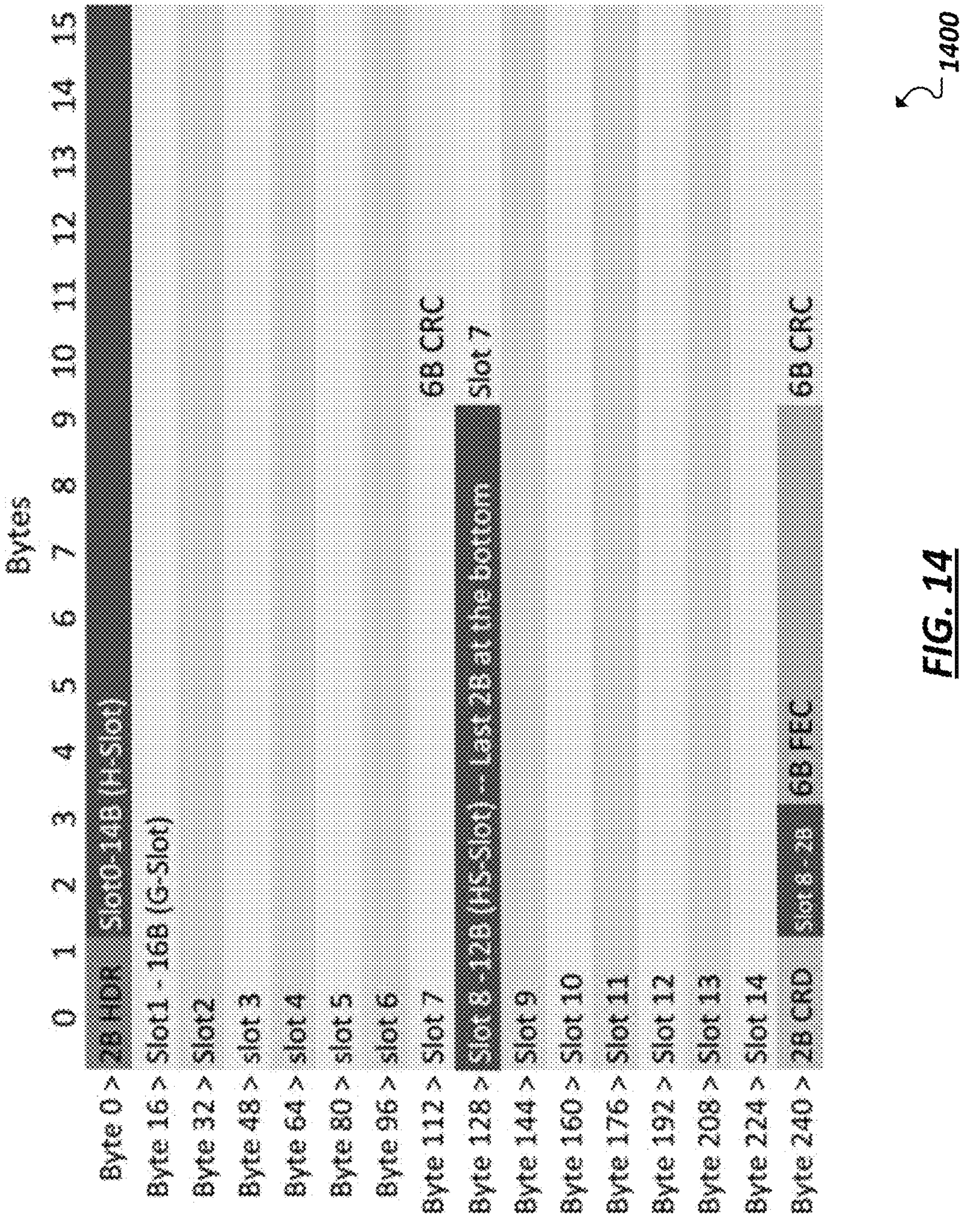
FIG. 14 is a representation of an example CXL latency optimized flit format.

Continuing with the example of FIG. 12A, 14 B of data (1230) at the end of the flit (in the final 64 B chunk) is reserved for the D2D adapter. This data 1230 may be populated with link management information, CRC, FEC, retry, header information, flow control information, or any other information that may be provided through the D2D adapter instead of the protocol layer (which services may be leveraged by any underlying protocol may leverage (even in lieu of comparable features provided natively by the underlying protocol)). FIG. 12B shows an alternative implementation of a mapping of PCIe flit data to a UCIe flit. In this example, 2 B in the first 64 B of data are reserved for populating with information from the D2D adapter, followed by 240 B of flit data (1240, 1245, 1250, 1255) provided by the protocol layer and then another 14 B (1260) reserved for the D2D adapter. When sending the data for the flit to the D2D adapter, the fields (e.g., 1230, 1235, 1260) reserved for the D2D adapter may be null values, driven to all 0s at the transmitter and ignored when received on the receiver of the protocol layer. In some implementations, a PCIe protocol layer configured to support UCIe may be optimized to omit support for 8 b/10 b and 128 b/130 b encoding, as well as non-flit-mode-related CRC/Retry or framing logic from the protocol layer in order to obtain area and power efficient designs for UCIe applications, among other example features.

Figure 13A:
FIGS. 13A-13B are representations of example data mappings for use by a protocol layer block to map flits of a Compute Express Link (CXL)-based protocol.
Figure 13B:
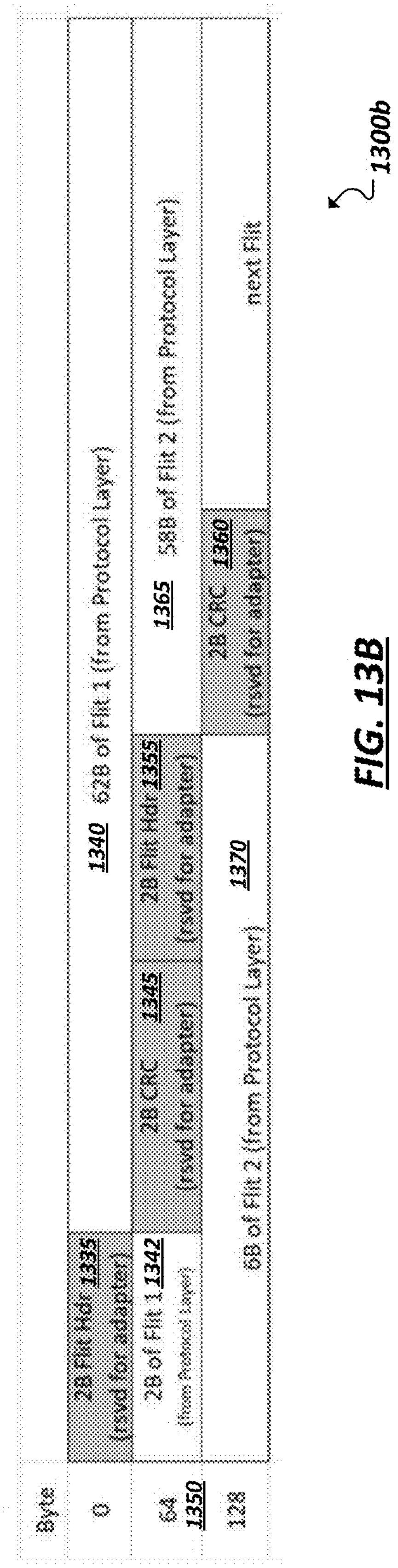

FIGS. 13A-13B illustrate example implementations of a standard mapping 1300*a-b* of CXL flits to UCIe. As shown in FIG. 13A, the standard 256 B Flit defined in CXL 3.0 specification may be mapped similar to the 256 B PCIe 6.0 flit mapping shown in FIGS. 12A-12B, with similar reserved fields (e.g., 1305, 1310) for the D2D adapter to use for the information it is to provide to the flit (e.g., link management information, CRC bits, etc.). Remaining data (e.g., 1315, 1320, 1325, 1330) may be provided by the CXL protocol layer. Support of the CXL standard flit mode enables interoperability with vendors that only support the standard CXL 256 B flit format. The protocol layer must follow the flit formats for flit transfer on FDI, driving 0 on the fields reserved for the D2D adapter. In one example, the Ack, Nak, power management, and link management DLLPs are not used over UCIe for CXL.io. The other DLLP information and flit status definitions may follow the same rules and packing as defined in the CXL specification. Portions of the DLP bytes may be driven by the protocol layer for flit marker assignment in some implementations. For CXL.cache/CXL.mem, in standard flit mode, FDI may provides a lp_corrupt_crc signal to help optimize for latency while guaranteeing viral containment, among other example features.

For 68 B flit formats defined in CXL (e.g., regular and enhanced 68 B flits defined in CXL 2.0), as represented in FIG. 13B, a mapping may be provided where the 68 B are time shifted over multiple 64 B blocks of UCIe data. For instance, a first 68 B CXL flit may be sent, with the first 2 B (1335) reserved for the D2D adapter (e.g., for flit header data), 62 B of flit data (1340, 1342) provided by the protocol layer, followed by another 2 B 1345) reserved for the D2D adapter (e.g., for CRC values). The second block of 64 B UCIe data (1350) may include the end of the first 68 B flit (the last 4 B) and beginning of the next 68 B flit (the first 60 B). This second flit may adopt the same format, with the first and last 2 B (1355, 1360) reserved for the D2D adapter and the middle 62 B (1365, 1370) provided by the protocol layer, and so on. In some implementations, the reserved portions of the flit may be populated by the D2D adapter to add a 2 B flit header and a 2 B CRC. The D2D adapter may also perform the byte shifting to arrange the 68 B flits into the 64 B unit flit segments.

In some implementations of a mapping of the 68B CXL flit in UCIe, power management, Ack, Nak, and DLLP are omitted for CXL.io. Credit updates and other remaining DLLPs for CXL.io may be included in the mapped flits in accordance with definitions within the CXL specification. In some instances, for CXL.io, the protocol layer transmitter does not implement retry, instead relying on the retry functionality of the D2D adapter. In order to keep the framing rules consistent, a CXL.io protocol layer may drive the LCRC bytes with a fixed value of 0, and the protocol layer receiver ignores these bytes on incoming data and does not send corresponding Ack or Nak DLLPs. For CXL.cache/CXL.mem, the "Ak" field in the flit may be reserved, and the retry flits are not used (in light of the D2D adapter's retry handling). Link initialization may begin with sending the INIT.Param Flit without waiting for any received flits. Viral containment, when applicable, may be handled within the protocol layer for the CXL 68 B flit mode, among other example features.

Figure 15A:
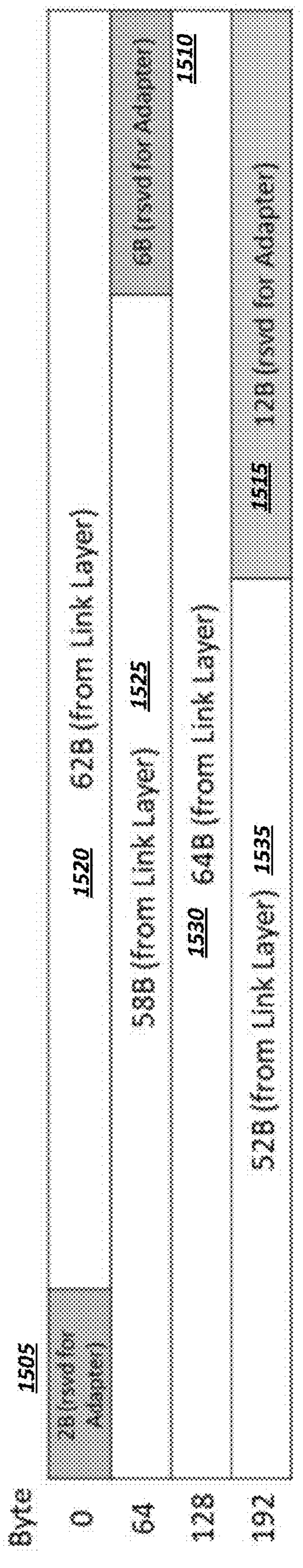
FIGS. 15A-15C are representations of example data mappings for use by a protocol layer block to map optimized flits of a CXL-based protocol.
Figure 15B:
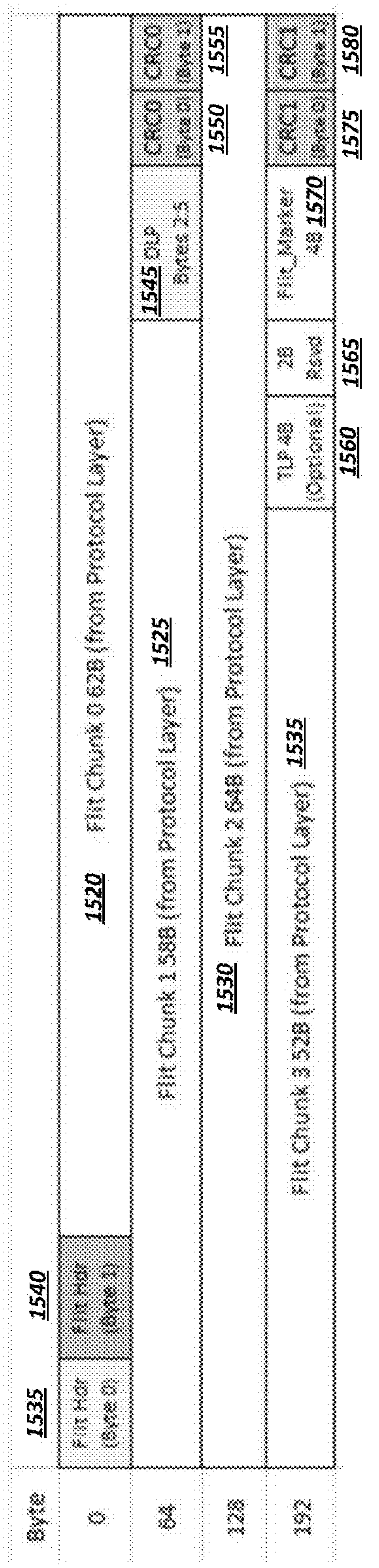
Figure 15C:
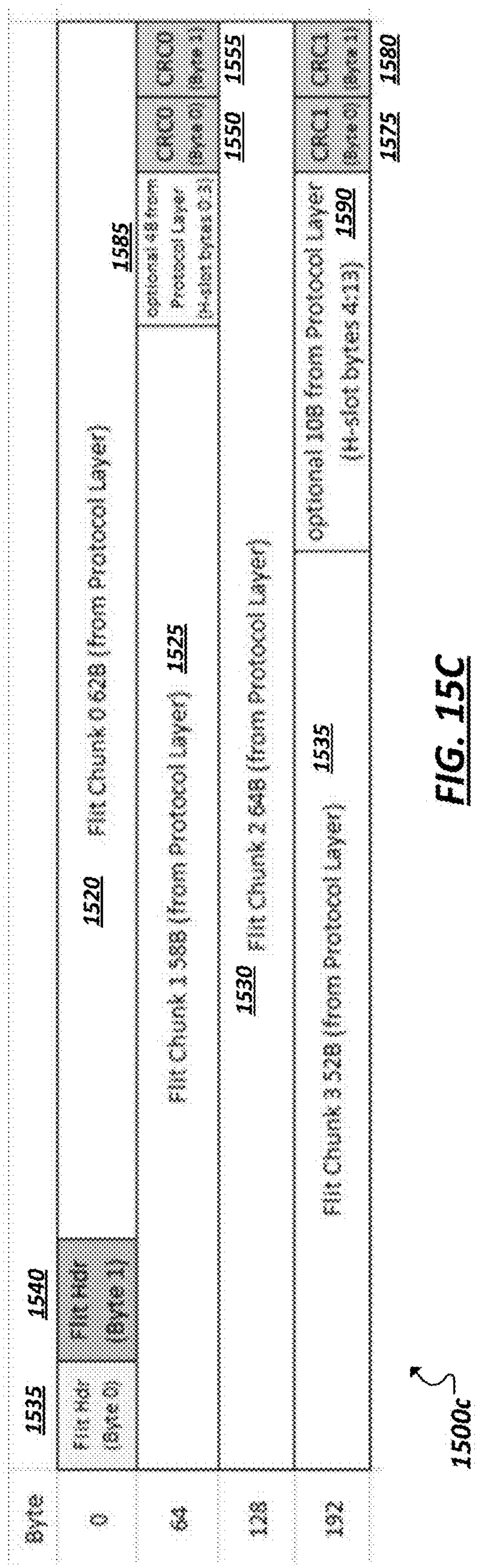

Some underlying protocols may support both standard flit formats, as well as optimized flit format (e.g., which may be used when certain link conditions are met). Turning to FIGS. 15A-15C, example flit mapping implementations 1500*a-c* are illustrated for optimized CXL flit formats. For instance, in CXL, optimized flit formats may include formats which reduce the size and/or frequency in which CRC and/or FEC bits are included in the flit (based on the application and/or characteristics/requirements for the link). In such cases, additional space in the flit is freed upon by the reduction in size or omission of certain fields defined for a standard version of the protocol's flit and additional information may be added in the optimized version of the flit to take advantage of this "free" space. For instance, a latency optimized version of a flit may allow a single flit to pass multiple messages, with a separate (abbreviated) CRC for each message, among other examples. FIG. 14 shows an example CXL latency optimized flit format 1400. As shown in FIG. 15A, an example mapping 1500*a* is shown for mapping the latency optimized CXL flit in FIG. 14 in UCIe. In this example, the protocol layer develops 256 B flit data in accordance with the optimized flit format, but reserves fields (e.g., 1505, 1510, 1515) handled by the D2D adapter in UCIe (e.g., header fields, CRC fields, etc.) for the D2D adapter (e.g., leaving bytes 1520, 1525, 1530, 1535 for the protocol layer). For instance, the protocol layer may present flit information in flits of 256 B, where all 256 B are available to transmit protocol layer messages and no bytes are reserved for DLLP, FEC, or CRC. CXL.io may be similar or identical to PCIe 6.0. CXL.cache/CXL.mem mapping on this mode, on the other hand, may have the entire 256 B available for CXL slots (e.g., all sixteen 16 B slots, as compared with CXL 3.0 which achieves either 240 B or 236 B in the latency optimized case).

Turning to FIGS. 15B-15C, in some implementations, multiple versions or formats of a latency optimized flit may be provided. For instance, in CXL, a first format may be provided for the CXL.io subprotocol and a second format for the CXL.mem and CXL.cache subprotocols. FIG. 15B shows an example mapping of a latency optimized flit for CXL.io. In CXL.io, an extra 4 B of TLP information 1560 is provided. In this example, 2 B (1535, 1540) are reserved for the D2D adapter to provide flit header information, 4 B (1545) are provided for DLP information, and 2 B (1550, 1555) for the CRC of the first flit chunk (e.g., 1520, 1525) of the flit. At the end of the mapped flit, 4 B (1560) of TLP information, 2 B of additional reserved data (1565), 4 B of flit marker data (1570), and CRC bytes (1575, 1580) (for the second flit chunk (1530, 1535) are provided as reserved bytes for populating by the D2D adapter. FIG. 15C shows the mapping of a latency optimized flit for CXL.mem/CXL.cache. In CXL.mem/CXL.cache, an extra 14 B header slot data (e.g., 1585, 1590) may be packed in the flit. Support for the respective optimized flit format mapping is negotiated at the time of link bring up. A latency-optimized mode, such as in the above examples, enables the protocol layer to consume the flit at a 128 B boundary, reducing the accumulation latency significantly. When this mode is negotiated, the protocol layer follows this flit format for flit transfer to the D2D adapter on FDI, driving 0 on the fields reserved for the D2D adapter. Further, Ack, Nak, power management, and link management DLLP information may not be used over UCIe for CXL.io for the CXL 256 B flit modes. Other DLLPs and flit marker definitions may follow the same rules as defined in the CXL specification. For CXL.cache/CXL.mem for this mode, FDI may provide a lp_corrupt_crc signal to help optimize for latency while guaranteeing viral containment, among other example features.

Figure 16A:
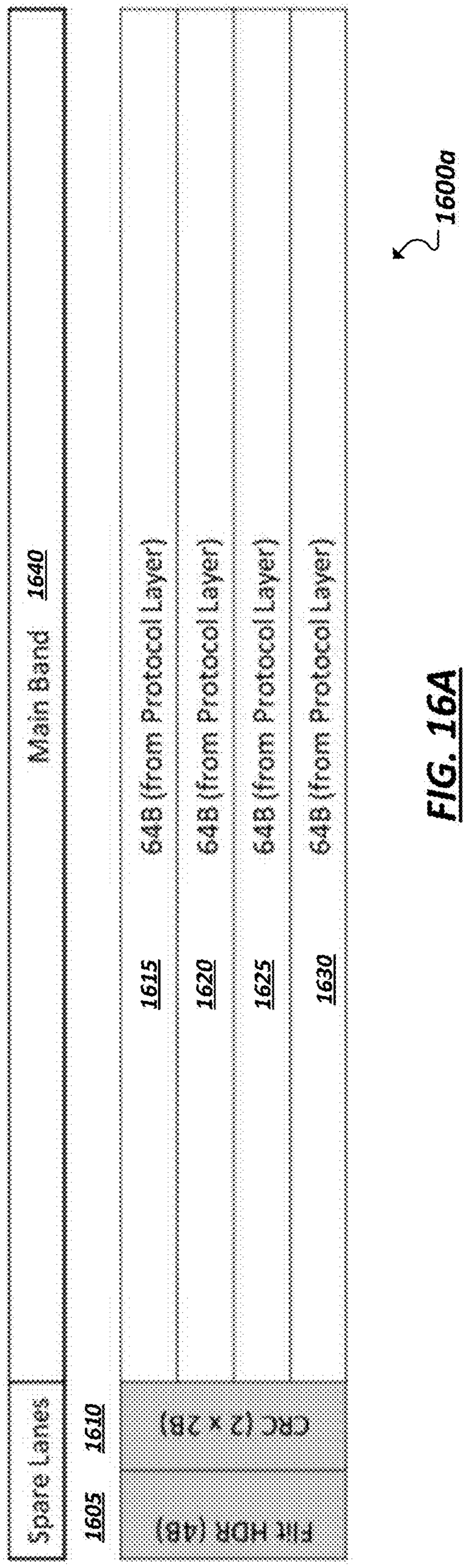
FIGS. 16A-16B are representations of example data mappings for use by a protocol layer block to map flits for use in an example advanced package interconnect.
Figure 16B:
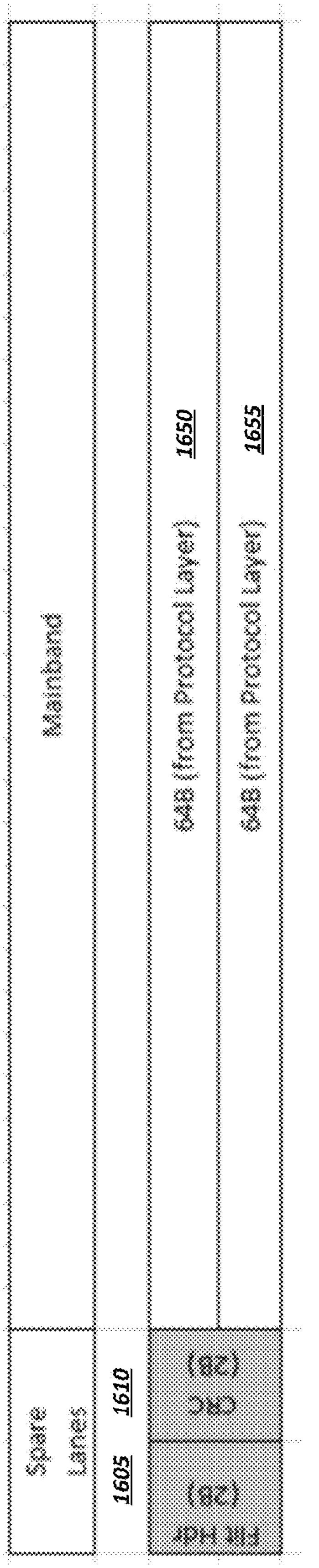

FIGS. 16A-16B show representations 1600*a-b* of example flit mappings in advanced package use cases where one or more spare lanes 1605, 1610 are available. For instance, in the example of FIG. 16A, an optimized mode for the mapping of a PCIe 6.0 flit is shown. Here, one spare lane 1610 is used to transmit CRC by the D2D adapter, while another spare lane 1605 is used to send flit header and credit return information. The protocol layer may present information in flits of 256 B (as opposed to the native 236 B in PCIe 6.0). Through this optimization, enabled by the spare lanes 1605, 1610, only TLP information (e.g., 1615, 1620, 1625, 1630) is transmitted on the main-band data path 1640. In one example, the Update FC DLLPs are recast as credit return bytes on the spare lane. The power management, link management, and no-operation (NOP) DLLPs may be omitted, as UCIe may provide its own substitute mechanisms. The remaining DLLPs (e.g., InitFC*, etc.) and Flit Status may be recast as special "UCIe Vendor Defined Message for DLLPs and Flit Status" TLP data in some implementations, among other example features.

FIG. 16B shows an example optimization of a 68 B CXL flit in an implementation providing two spare lanes 1605, 1610. In this example, one spare lane (e.g., 1610) is used to transmit a CRC (e.g., generated by the D2D adapter) and the other spare lane (e.g., 1605) is used to send flit header and credit return information. The protocol layer generates the information in 64 B chunks (e.g., 1650, 1655), and the spare lanes allow CRC and Protocol ID bits to be omitted from the main band date. In one example for CXL.io, the transmitter does not implement retry in the protocol layer, with retry instead being handled in the D2D adapter. In order to keep the framing rules consistent, the protocol layer transmitted drives the LCRC bytes with a fixed value of 0, and the protocol layer receiver ignores these same bytes in received data and does not send any Ack or Nak DLLPs. In an example of CXL.cache/CXL.mem, the "Ak" field in the flit is reserved, and the Retry flits are not used (since Retry is handled in the D2D adapter). Link Initialization begins with sending the INIT.Param flit without waiting for any received flits.

Figure 17:
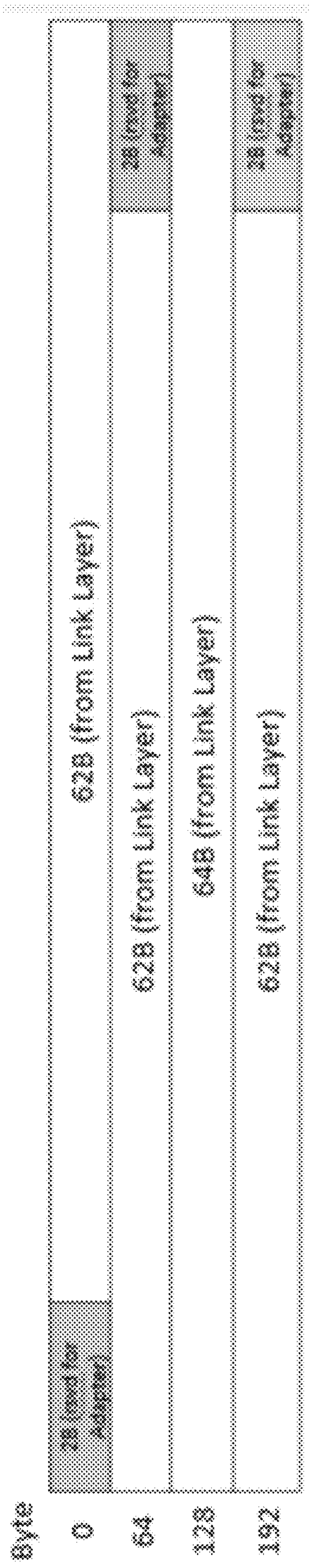
FIG. 17 is a representation of an example data mapping for use by a protocol layer block in a steaming mode.

Turning to FIG. 17, a representation 1700 is shown of UCIe flit mapping in a streaming mode. When negotiated by the D2D adapter and identified to the protocol layer as the mode to adopt, in a streaming mode bytes transferred from the protocol Layer can be packed into multiple UCIe-supported formats depending on the negotiated mode of operation. FIG. 17 represents one such format, which may be agreed upon between link partner D2D adapters. Vendor-defined formats and extensions may also be supported and negotiated. As in other mappings, some portions of the UCIe streaming flit mapping may be reserved for fields and values determined in accordance with functionality of the D2D adapter. In this manner, the protocol layer may delegate certain functions (e.g., error detection, error correction, link management, power management, etc.) to the D2D adapter. The protocol layer may populate those sections (e.g., 1720, 1725, 1730, 1735) of the flit dedicated to the protocol layer with protocol data of potentially any underlying protocol (e.g., including proprietary vendor-defined protocols, latency optimized protocols or mode, etc.), with the protocol layer sending the resulting flit across the FDI to the D2D adapter with reserved sections (e.g., 1705, 1710, 1715) set to 0. Likewise, when receiving a flit in streaming mode, the protocol layer is to ignore data in those fields (e.g., 1705, 1710, 1715) reserved for (and to be consumed by) the D2D adapter.

Interoperability of devices may be facilitated through the various modes offered in a UCIe system. Such interoperability may even facilitate backward compatibility (e.g., through raw and streaming modes, among others). In one example implementation, PCIe and CXL protocols may be explicitly mapped in UCIe and devices advertising their native support of a mapped, underlying protocol may be assumed to support corresponding flit modes. Some flit modes may be designated mandatory and others options, such as illustrated in the example of Table 1:

TABLE 1

| Specification-to-Protocol Mode Mapping | | | |
|---|---|---|---|
| Native Spec Supported | CXL 2.0 68 Flit Mode | CXL 256 B Flit Mode | PCIe 6.0 Flit Mode |
| PCIe | Mandatory (CXL.io) | N/A | Optional |
| CXL 2.0 | Mandatory | N/A | N/A |
| CXL 3.0 | Mandatory | Mandatory | Mandatory (CXL.io) |

Table 2 summarizes the set of modes that may be available for use in a corresponding example system:

TABLE 2

| Modes of Operation for Supported Protocols | | | | |
|---|---|---|---|---|
| Operation Mode | PCIe 6.0 Flit Mode | CXL 2.0 "CXL 68 B-Enhanced Flit Mode" | CXL 256 B Flit Mode | Streaming Protocol |
| Raw Mode | Optional | Optional | Optional | Mandatory |
| Flit Mode: Standard 256 B Flit | Mandatory | N/A | Mandatory | N/A |
| Flit Mode: Latency-Optimized 256 B Flit | N/A | N/A | Recommended | N/A |
| Flit Mode: 68 B Flit | N/A | Mandatory | N/A | N/A |

Similarly, Table 3 illustrates example interoperability between endpoint devices and root ports in a system:

TABLE 3

| End Point-Root Port Interoperability Matrix | | | | |
|---|---|---|---|---|
| | Root Port | | | |
| Endpoint | PCIe Gen 5 | PCIe Gen 6 | CXL 2.0 | CXL 3.0 |
| PCIe Gen 5 | CXL 2.0 68 B Flit Mode (CXL.io) | CXL 2.0 68 B Flit Mode (CXL.io) | CXL 2.0 68 B Flit Mode (CXL.io) | CXL 2.0 68 B Flit Mode (CXL.io) |
| PCIe Gen 6 | CXL 2.0 68 B Flit Mode (CXL.io) | PCIe 6.0 Flit Mode | CXL 2.0 68 B Flit Mode (CXL.io) | PCIe 6.0 Flit Mode |
| CXL 2.0 | CXL 2.0 68 B Flit Mode (CXL.io) | CXL 2.0 68 B Flit Mode (CXL.io) | CXL 2.0 68 B Flit Mode (CXL.io) | CXL 2.0 68 B Flit Mode (CXL.io) |
| CXL 3.0 | CXL 2.0 68 B Flit Mode (CXL.io) | PCIe 6.0 Flit Mode | CXL 2.0 68 B Flit Mode (CXL.io) | CXL 256 B Flit Mode |

Note that the apparatus', methods', and systems described above may be implemented in any electronic device or system as aforementioned. As specific illustrations, the figures below provide exemplary systems for utilizing the solutions as described herein. As the systems below are described in more detail, a number of different interconnects are disclosed, described, and revisited from the discussion above. While some of the examples above were based on CXL- or PCIe-based interconnects and devices, it should be appreciated that the solutions and features discussed above may be just as readily applied to other interconnect or protocol used to couple sockets, packages, boards, and the like within various computing platforms. As is readily apparent, the advances described above and UCIe-based protocols may be applied to any of the interconnects, fabrics, or architectures discussed herein, as well as other comparable interconnects, fabrics, or architectures not explicitly named or illustrated herein.

Figure 18:
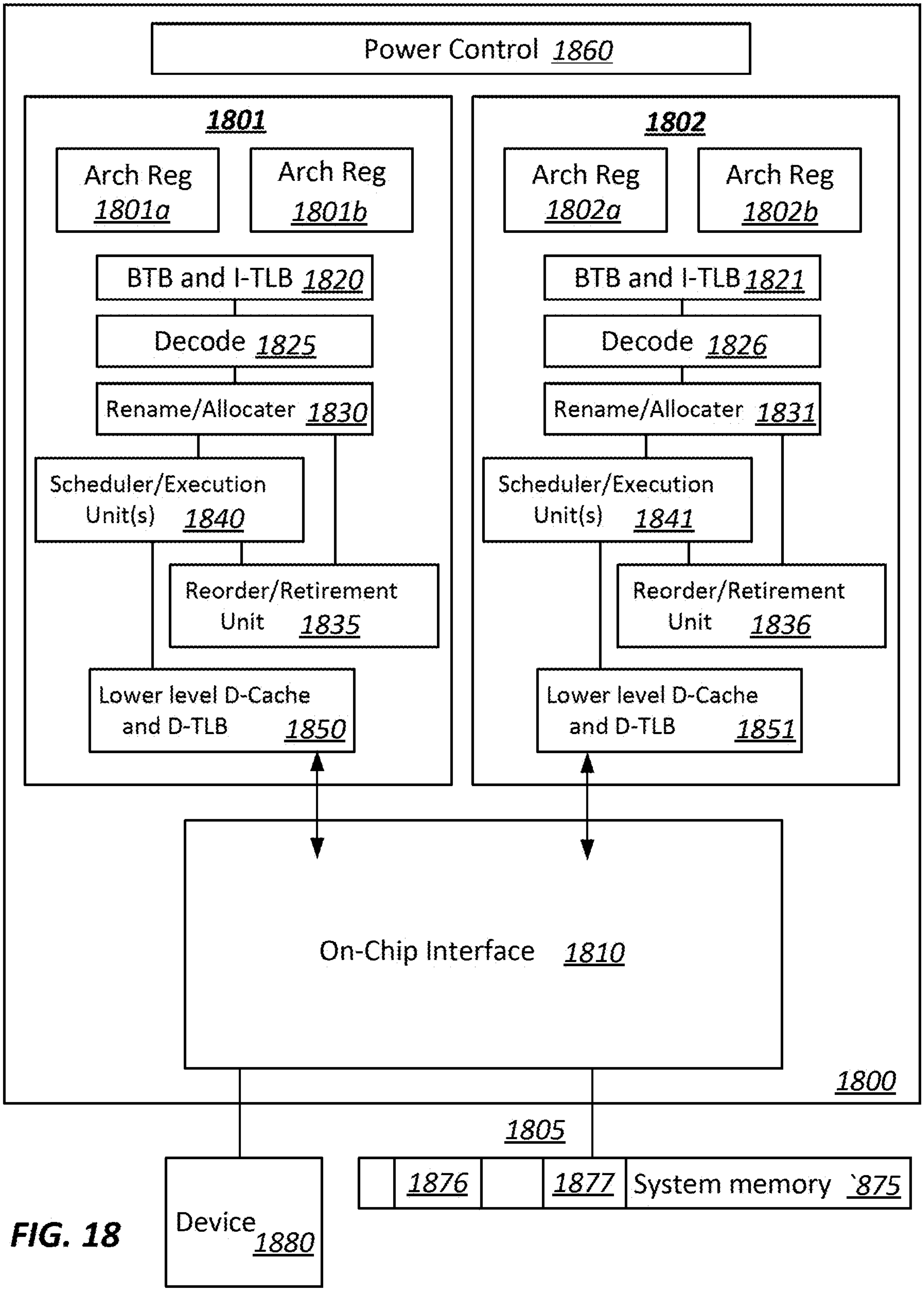
FIG. 18 illustrates an embodiment of a block diagram for a computing system including a multicore processor.

Referring to FIG. 18, an embodiment of a block diagram for a computing system including a multicore processor is depicted. Processor 1800 includes any processor or processing device, such as a microprocessor, an embedded processor, a digital signal processor (DSP), a network processor, a handheld processor, an application processor, a co-processor, a system on a chip (SOC), or other device to execute code. Processor 1800, in one embodiment, includes at least two cores—core 1801 and 1802, which may include asymmetric cores or symmetric cores (the illustrated embodiment). However, processor 1800 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1800, as illustrated in FIG. 18, includes two cores—core 1801 and 1802. Here, core 1801 and 1802 are considered symmetric cores, i.e. cores with the same configurations, functional units, and/or logic. In another embodiment, core 1801 includes an out-of-order processor core, while core 1802 includes an in-order processor core. However, cores 1801 and 1802 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 1801 are described in further detail below, as the units in core 1802 operate in a similar manner in the depicted embodiment.

As depicted, core 1801 includes two hardware threads 1801*a* and 1801*b*, which may also be referred to as hardware thread slots 1801*a* and 1801*b*. Therefore, software entities, such as an operating system, in one embodiment potentially view processor 1800 as four separate processors, i.e., four logical processors or processing elements capable of executing four software threads concurrently. As alluded to above, a first thread is associated with architecture state registers 1801*a*, a second thread is associated with architecture state registers 1801*b*, a third thread may be associated with architecture state registers 1802*a*, and a fourth thread may be associated with architecture state registers 1802*b*. Here, each of the architecture state registers (1401*a*, 1801*b*, 1802*a*, and 1802*b*) may be referred to as processing elements, thread slots, or thread units, as described above. As illustrated, architecture state registers 1801*a* are replicated in architecture state registers 1801*b*, so individual architecture states/contexts are capable of being stored for logical processor 1801*a* and logical processor 1801*b*. In core 1801, other smaller resources, such as instruction pointers and renaming logic in allocator and renamer block 1830 may also be replicated for threads 1801*a* and 1801*b*. Some resources, such as re-order buffers in reorder/retirement unit 1835, ILTB 1820, load/store buffers, and queues may be shared through partitioning. Other resources, such as general purpose internal registers, page-table base register(s), low-level data-cache and data-TLB 1815, execution unit(s) 1840, and portions of out-of-order unit 1835 are potentially fully shared.

Processor 1800 often includes other resources, which may be fully shared, shared through partitioning, or dedicated by/to processing elements. In FIG. 18, an embodiment of a purely exemplary processor with illustrative logical units/resources of a processor is illustrated. Note that a processor may include, or omit, any of these functional units, as well as include any other known functional units, logic, or firmware not depicted. As illustrated, core 1801 includes a simplified, representative out-of-order (OOO) processor core. But an in-order processor may be utilized in different embodiments. The OOO core includes a branch target buffer 1820 to predict branches to be executed/taken and an instruction-translation buffer (I-TLB) 1820 to store address translation entries for instructions.

Core 1801 further includes decode module 1825 coupled to fetch unit 1820 to decode fetched elements. Fetch logic, in one embodiment, includes individual sequencers associated with thread slots 1801*a*, 1801*b*, respectively. Usually core 1801 is associated with a first ISA, which defines/specifies instructions executable on processor 1800. Often machine code instructions that are part of the first ISA include a portion of the instruction (referred to as an opcode), which references/specifies an instruction or operation to be performed. Decode logic 1825 includes circuitry that recognizes these instructions from their opcodes and passes the decoded instructions on in the pipeline for processing as defined by the first ISA. For example, as discussed in more detail below decoders 1825, in one embodiment, include logic designed or adapted to recognize specific instructions, such as transactional instruction. As a result of the recognition by decoders 1825, the architecture or core 1801 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 1826, in one embodiment, recognize the same ISA (or a subset thereof). Alternatively, in a heterogeneous core environment, decoders 1826 recognize a second ISA (either a subset of the first ISA or a distinct ISA).

In one example, allocator and renamer block 1830 includes an allocator to reserve resources, such as register files to store instruction processing results. However, threads 1801*a* and 1801*b* are potentially capable of out-of-order execution, where allocator and renamer block 1830 also reserves other resources, such as reorder buffers to track instruction results. Unit 1830 may also include a register renamer to rename program/instruction reference registers to other registers internal to processor 1800. Reorder/retirement unit 1835 includes components, such as the reorder buffers mentioned above, load buffers, and store buffers, to support out-of-order execution and later in-order retirement of instructions executed out-of-order.

Scheduler and execution unit(s) block 1840, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1850 are coupled to execution unit(s) 1840. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1801 and 1802 share access to higher-level or further-out cache, such as a second level cache associated with on-chip interface 1810. Note that higher-level or further-out refers to cache levels increasing or getting further way from the execution unit(s). In one embodiment, higher-level cache is a last-level data cache—last cache in the memory hierarchy on processor 1800—such as a second or third level data cache. However, higher level cache is not so limited, as it may be associated with or include an instruction cache. A trace cache—a type of instruction cache—instead may be coupled after decoder 1825 to store recently decoded traces. Here, an instruction potentially refers to a macro-instruction (i.e. a general instruction recognized by the decoders), which may decode into a number of micro-instructions (micro-operations).

In the depicted configuration, processor 1800 also includes on-chip interface module 1810. Historically, a memory controller, which is described in more detail below, has been included in a computing system external to processor 1800. In this scenario, on-chip interface 1810 is to communicate with devices external to processor 1800, such as system memory 1875, a chipset (often including a memory controller hub to connect to memory 1875 and an I/O controller hub to connect peripheral devices), a memory controller hub, a northbridge, or other integrated circuit. And in this scenario, bus 1805 may include any known interconnect, such as multi-drop bus, a point-to-point interconnect, a serial interconnect, a parallel bus, a coherent (e.g. cache coherent) bus, a layered protocol architecture, a differential bus, and a GTL bus. Bus 1805, as well as other links, interconnects, and fabrics interconnecting elements in the system of FIG. 18 may be implemented using UCIe, according to the principles discussed above. In some implementations, one or more of the elements shown in the system of FIG. 18 may be provided and interconnected on the same package. In some instances, some of the interconnected elements may be on different packages and coupled by off-package links, among other examples.

Memory 1875 may be dedicated to processor 1800 or shared with other devices in a system. Common examples of types of memory 1875 include DRAM, SRAM, non-volatile memory (NV memory), and other known storage devices. Note that device 1880 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 1800. For example in one embodiment, a memory controller hub is on the same package and/or die with processor 1800. Here, a portion of the core (an on-core portion) 1810 includes one or more controller(s) for interfacing with other devices such as memory 1875 or a graphics device 1880. The configuration including an interconnect and controllers for interfacing with such devices is often referred to as an on-core (or un-core configuration). As an example, on-chip interface 1810 includes a ring interconnect for on-chip communication and a high-speed serial point-to-point link 1805 for off-chip communication. Yet, in the SOC environment, even more devices, such as the network interface, co-processors, memory 1875, graphics processor 1880, and any other known computer devices/interface may be integrated on a single die or integrated circuit to provide small form factor with high functionality and low power consumption.

In one embodiment, processor 1800 is capable of executing a compiler, optimization, and/or translator code 1877 to compile, translate, and/or optimize application code 1876 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 19:
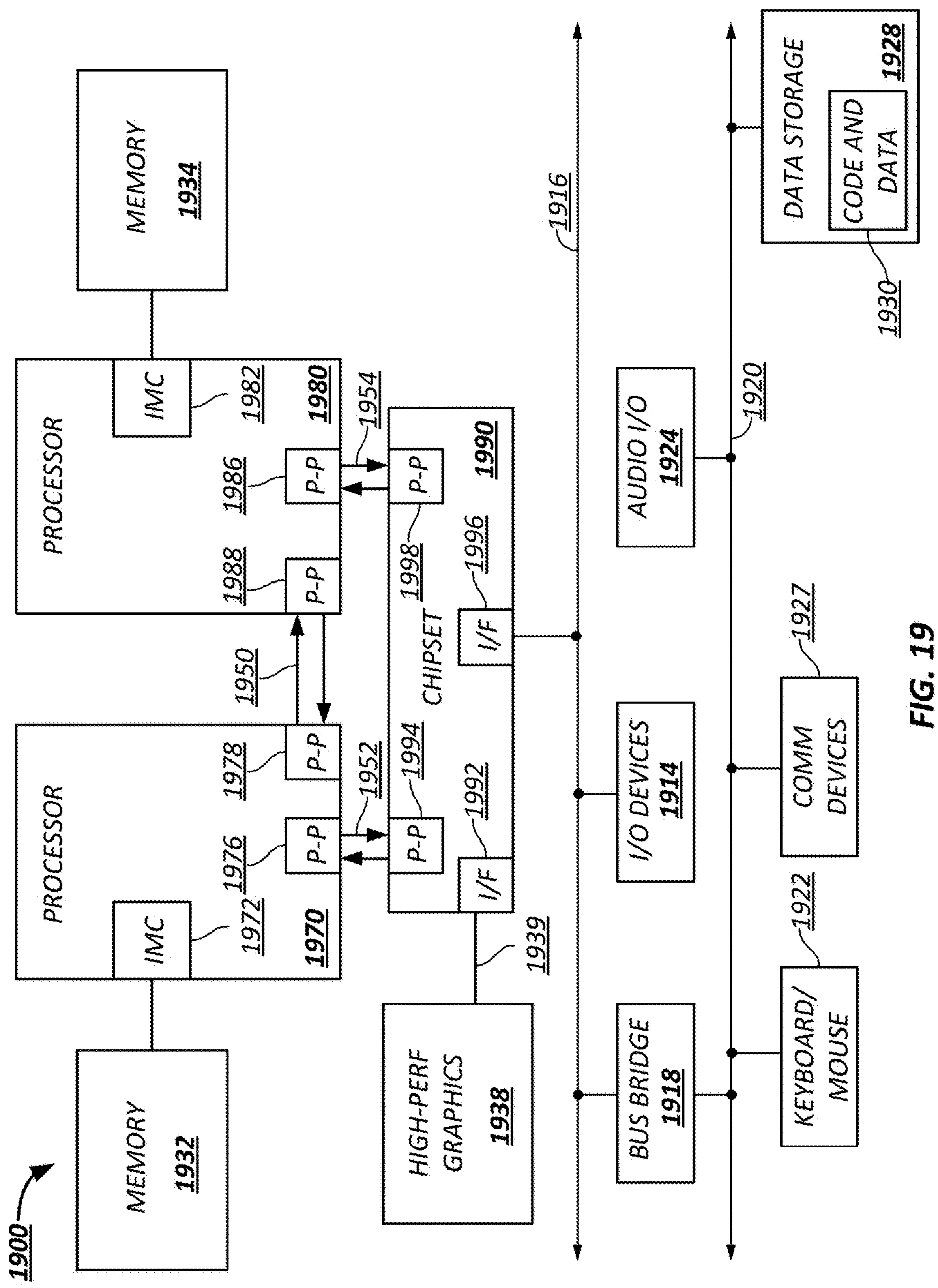
FIG. 19 illustrates an embodiment of a block for a computing system including multiple processors.

Referring now to FIG. 19, shown is a block diagram of a second system 1900 in accordance with an embodiment of the present disclosure. As shown in FIG. 19, multiprocessor system 1900 is a point-to-point interconnect system, and includes a first processor 1970 and a second processor 1980 coupled via a point-to-point interconnect 1950. Links, buses, interconnects, and fabrics interconnecting elements in the system may be implemented using UCIe, according to the principles discussed above. In some implementations, one or more of the elements shown in the system of FIG. 19 may be provided and interconnected on the same package. In some instances, some of the interconnected elements may be on different packages and coupled by off-package links, among other examples. Each of processors 1970 and 1980 may be some version of a processor. In one embodiment, 1952 and 1954 are part of a serial, point-to-point coherent interconnect fabric, such as a high-performance architecture. As a result, the solutions described herein may be implemented within a UPI or other architecture.

While shown with only two processors 1970, 1980, it is to be understood that the scope of the present disclosure is not so limited. In other embodiments, one or more additional processors may be present in a given processor.

Processors 1970 and 1980 are shown including integrated memory controller units 1972 and 1982, respectively. Processor 1970 also includes as part of its bus controller units point-to-point (P-P) interfaces 1976 and 1978; similarly, second processor 1980 includes P-P interfaces 1986 and 1988. Processors 1970, 1980 may exchange information via a point-to-point (P-P) interface 1950 using P-P interface circuits 1978, 1988. As shown in FIG. 19, IMCs 1972 and 1982 couple the processors to respective memories, namely a memory 1932 and a memory 1934, which may be portions of main memory locally attached to the respective processors.

Processors 1970, 1980 each exchange information with a chipset 1990 via individual P-P interfaces 1952, 1954 using point to point interface circuits 1976, 1994, 1986, 1998. Chipset 1990 also exchanges information with a high-performance graphics circuit 1938 via an interface circuit 1992 along a high-performance graphics interconnect 1939.

A shared cache (not shown) may be included in either processor or outside of both processors; yet connected with the processors via P-P interconnect, such that either or both processors' local cache information may be stored in the shared cache if a processor is placed into a low power mode.

Chipset 1990 may be coupled to a first bus 1916 via an interface 1996. In one embodiment, first bus 1916 may be a Peripheral Component Interconnect (PCI) bus, or a bus such as a PCI Express bus or another third generation I/O interconnect bus, although the scope of the present disclosure is not so limited.

As shown in FIG. 19, various I/O devices 1914 are coupled to first bus 1916, along with a bus bridge 1918 which couples first bus 1916 to a second bus 1920. In one embodiment, second bus 1920 includes a low pin count (LPC) bus. Various devices are coupled to second bus 1920 including, for example, a keyboard and/or mouse 1922, communication devices 1927 and a storage unit 1928 such as a disk drive or other mass storage device which often includes instructions/code and data 1930, in one embodiment. Further, an audio I/O 1924 is shown coupled to second bus 1920. Note that other architectures are possible, where the included components and interconnect architectures vary. For example, instead of the point-to-point architecture of FIG. 19, a system may implement a multi-drop bus or other such architecture.

While the solutions discussed herein have been described with respect to a limited number of embodiments, those skilled in the art will appreciate numerous modifications and variations therefrom. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosures.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform example embodiments herein may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. Example 1 is an apparatus including: protocol circuitry to implement a particular interconnect protocol, where the particular interconnect protocol defines a particular data format, and the protocol circuitry is to: receive an indication that a particular mode is to be utilized on a die-to-die (D2D) link, where the D2D link is to connect a first die to a second die; generate data to be sent on the D2D link, where the data is generated to adapt the particular data format to a flit format defined for use on the D2D link in the particular mode, and adapting the particular data format to the flit format includes providing a set of reserved fields to be completed by an adapter block positioned between the protocol circuitry and a physical layer block; and send the data to the adapter block to prepare the data for transmission over the D2D link by the physical layer block.

Example 2 includes the subject matter of example 1, where the indication is received from the adapter block, the adapter block is to populate the set of reserved fields with information prior to transmission of the data over the D2D link.

Example 3 includes the subject matter of example 2, where the set of reserved fields are to be populated by the protocol circuitry under a native version of the particular interconnect protocol, but are instead populated by the adapter blocks in the data based on the particular mode.

Example 4 includes the subject matter of example 3, where the protocol circuitry populates the set of reserved fields with all zeroes based on the particular mode.

Example 5 includes the subject matter of any one of examples 3-4, where the set of reserved fields includes a cyclic redundancy check (CRC) field.

Example 6 includes the subject matter of any one of examples 3-5, where the set of reserved fields includes a header field.

Example 7 includes the subject matter of any one of examples 1-6, where the indication is based on characteristics of the D2D link determined during link training.

Example 8 includes the subject matter of example 7, where the characteristics include whether the D2D link includes extra lanes provisioned for lane repair on the D2D link, and protocol data in a portion of the particular data format is allocated for transmission using the extra lanes.

Example 9 includes the subject matter of any one of examples 1-8, where the particular mode is selected from a plurality of modes, and the plurality of modes include a standard flit mode, an optimized mode, and a raw mode.

Example 10 includes the subject matter of example 9, where the protocol circuitry is to generate data to include reserved portions to be completed by the adapter block in the standard mode and the optimized mode, and the protocol circuitry is to generate data in unmodified form in the raw mode, where the adapter block is to pass data generated by the protocol circuitry to the physical layer block as-is in the raw mode.

Example 11 includes the subject matter of any one of examples 9-10, where the set of reserved fields are defined according to a mapping for the particular interconnect protocol.

Example 12 includes the subject matter of example 11, where the particular interconnect protocol includes one of Peripheral Component Interconnect Express (PCIe) or Compute Express Link (CXL), and a respective predefined mapping is provided for each of the standard mode, the optimized mode, and raw mode for the particular interconnect protocol.

Example 13 includes the subject matter of any one of examples 1-12, where the flit format is defined in another interconnect protocol different from the particular interconnect protocol.

Example 14 is a method including: determining that a particular operational mode for a particular interconnect protocol is supported by both a first die and a second die for use on a die-to-die (D2D) link, where the first die and the second die are to be connected by the D2D link; generating data, at a protocol layer of the first die, to be sent over the D2D link to the second die, where the protocol layer is to implement the particular interconnect protocol and the particular interconnect protocol defines a particular data format; converting the data from the particular data format to a flit format defined for use on the D2D link to generate adapted data based on the particular operational mode; and passing the adapted data from the protocol layer to an adapter block of the first die, where the adapter block is positioned between the protocol layer and a physical layer (PHY) block of the first die, where the PHY block is to implement a physical layer of the D2D link.

Example 15 includes the subject matter of example 14, where the flit format includes a set of reserved fields to replace fields defined in the particular interconnect protocol, and the adapter block is complete the set of reserved fields before forwarding the adapted data to the PHY block.

Example 16 includes the subject matter of example 15, further including sending the adapted data with the completed set of reserved fields to the second die over the D2D link.

Example 17 includes the subject matter of any one of examples 14-16, where the particular operational mode is determined based on characteristics of the D2D link determined during link training.

Example 18 includes the subject matter of example 17, where the characteristics include whether the D2D link includes extra lanes provisioned for lane repair on the D2D link, and protocol data in a portion of the particular data format is allocated for transmission using the extra lanes.

Example 19 includes the subject matter of any one of examples 14-18, where the particular operational mode is selected from a plurality of modes, and the plurality of modes include a standard flit mode, an optimized mode, and a raw mode.

Example 20 includes the subject matter of example 19, where the protocol circuitry is to generate data to include reserved portions to be completed by the adapter block in the standard mode and the optimized mode, and the protocol circuitry is to generate data in unmodified form in the raw mode, where the adapter block is to pass data generated by the protocol circuitry to the physical layer block as-is in the raw mode.

Example 21 includes the subject matter of any one of examples 19-20, where the set of reserved fields are defined according to a mapping for the particular interconnect protocol.

Example 22 includes the subject matter of example 21, where the particular interconnect protocol includes one of Peripheral Component Interconnect Express (PCIe) or Compute Express Link (CXL), and a respective predefined mapping is provided for each of the standard mode, the optimized mode, and raw mode for the particular interconnect protocol.

Example 23 includes the subject matter of any one of examples 14-22, where the flit format is defined in another interconnect protocol different from the particular interconnect protocol.

Example 24 is a system including means to perform the method of any one of examples 14-23.

Example 25 includes the subject matter of example 25, where the means include a non-transitory machine-readable storage medium with instructions stored thereon, the instructions executable by a machine to cause the machine to perform at least a portion of the method of any one of examples 14-23.

Example 26 is a system including: a first die; and a second die coupled to the first die by a die-to-die (D2D) link, where the second die includes a port to connect the second die to the D2D link, and the port includes: protocol layer logic to implement a particular interconnect protocol, where the particular interconnect protocol defines a particular data format; die-to-die adapter circuitry; and physical layer circuitry, where the die-to-die adapter is positioned between the protocol layer logic and the physical layer circuitry in a protocol stack for the D2D link, and the protocol logic is executable to: receive an indication that a particular one of a plurality of different operational modes is to be utilized for the particular interconnect protocol on the D2D link; generate data to be sent on the D2D link based on the particular operational mode, where the data is generated to adapt the particular data format to a flit format defined for use on the D2D link in the particular operational mode, where the flit format includes a set of reserved fields to replace fields defined in the particular data format; and send the data in the flit format to the die-to-die adapter circuitry, where the die-to-die adapter circuitry is to populate the set of reserved fields with additional data to generate flit data for transmission over the D2D link to the first die.

Example 27 includes the subject matter of example 26, where the indication is received from the adapter block, the adapter block is to populate the set of reserved fields with information prior to transmission of the data over the D2D link.

Example 28 includes the subject matter of example 27, where the set of reserved fields are to be populated by the protocol circuitry under a native version of the particular interconnect protocol, but are instead populated by the adapter blocks in the data based on the particular mode.

Example 29 includes the subject matter of example 28, where the protocol circuitry populates the set of reserved fields with all zeroes based on the particular mode.

Example 30 includes the subject matter of any one of examples 28-29, where the set of reserved fields includes a cyclic redundancy check (CRC) field.

Example 31 includes the subject matter of any one of examples 28-30, where the set of reserved fields includes a header field.

Example 32 includes the subject matter of any one of examples 26-31, where the indication is based on characteristics of the D2D link determined during link training.

Example 33 includes the subject matter of example 32, where the characteristics include whether the D2D link includes extra lanes provisioned for lane repair on the D2D link, and protocol data in a portion of the particular data format is allocated for transmission using the extra lanes.

Example 34 includes the subject matter of any one of examples 26-33, where the particular mode is selected from a plurality of modes, and the plurality of modes include a standard flit mode, an optimized mode, and a raw mode.

Example 35 includes the subject matter of example 34, where the protocol circuitry is to generate data to include reserved portions to be completed by the adapter block in the standard mode and the optimized mode, and the protocol circuitry is to generate data in unmodified form in the raw mode, where the adapter block is to pass data generated by the protocol circuitry to the physical layer block as-is in the raw mode.

Example 36 includes the subject matter of any one of examples 34-35, where the set of reserved fields are defined according to a mapping for the particular interconnect protocol.

Example 37 includes the subject matter of example 36, where the particular interconnect protocol includes one of Peripheral Component Interconnect Express (PCIe) or Compute Express Link (CXL), and a respective predefined mapping is provided for each of the standard mode, the optimized mode, and raw mode for the particular interconnect protocol.

Example 38 includes the subject matter of any one of examples 26-37, where the flit format is defined in another interconnect protocol different from the particular interconnect protocol.

Example 39 includes the subject matter of any one of examples 26-38, where the first die includes a processor device, and the second die includes one of another processor device, a hardware accelerator, or an input/output (I/O) device.

Example 40 includes the subject matter of any one of examples 26-38, where the first die and the second die are on a same package.

Example 41 includes the subject matter of any one of examples 26-38, where the first die includes a first retimer, the second die includes a second retimer, the first die and the second die are on separate packages, and the D2D link implements an off-package interconnect.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:

protocol circuitry to implement a particular interconnect protocol, wherein the particular interconnect protocol defines a particular data format, and the protocol circuitry is to:

receive an indication that a particular mode in a plurality of modes associated with the particular interconnect protocol is to be utilized on a die-to-die (D2D) link, wherein the D2D link is to connect a first die to a second die, and a plurality of flit formats are defined to correspond to the plurality of modes;

generate data to be sent on the D2D link, wherein the data is generated to adapt the particular data format to a particular flit format in the plurality of flit formats defined for use on the D2D link in the particular mode, and adapting the particular data format to the particular flit format comprises providing a set of reserved fields to be completed by an adapter block positioned between the protocol circuitry and a physical layer block; and send the data to the adapter block to prepare the data for transmission over the D2D link by the physical layer block.

2. The apparatus of claim 1, wherein the indication is received from the adapter block, the adapter block is to populate the set of reserved fields with information prior to transmission of the data over the D2D link.

3. The apparatus of claim 2, wherein the set of reserved fields are to be populated by the protocol circuitry under a native version of the particular interconnect protocol, but are instead populated by the adapter blocks in the data based on the particular mode.

4. The apparatus of claim 3, wherein the protocol circuitry populates the set of reserved fields with all zeroes based on the particular mode.

5. The apparatus of claim 3, wherein the set of reserved fields comprises a cyclic redundancy check (CRC) field to be populated by the adapter block.

6. The apparatus of claim 3, wherein the set of reserved fields comprises a header field to be populated by the adapter block.

7. The apparatus of claim 1, wherein the indication is based on characteristics of the D2D link determined during link training.

8. The apparatus of claim 7, wherein the characteristics comprise whether the D2D link includes extra lanes provisioned for lane repair on the D2D link, and protocol data in a portion of the particular data format is allocated for transmission using the extra lanes.

9. The apparatus of claim 1, wherein the plurality of modes comprise a standard flit mode, an optimized mode, and a raw mode.

10. The apparatus of claim 9, wherein the protocol circuitry is to generate data to include reserved portions to be completed by the adapter block in the standard mode and the optimized mode, and the protocol circuitry is to generate data in unmodified form in the raw mode, wherein the adapter block is to pass data generated by the protocol circuitry to the physical layer block as-is in the raw mode.

11. The apparatus of claim 9, wherein the set of reserved fields are defined according to a mapping for the particular interconnect protocol.

12. The apparatus of claim 11, wherein the particular interconnect protocol comprises one of Peripheral Component Interconnect Express (PCIe) or Compute Express Link (CXL), and a respective predefined mapping is provided for each of the standard mode, the optimized mode, and raw mode for the particular interconnect protocol.

13. The apparatus of claim 1, wherein the particular flit format is defined in another interconnect protocol different from the particular interconnect protocol.

14. A method comprising:

determining that a particular operational mode in a plurality of different operational modes for a particular interconnect protocol is supported by both a first die and a second die for use on a die-to-die (D2D) link, wherein the first die and the second die are to be connected by the D2D link;

generating data, at a protocol layer of the first die, to be sent over the D2D link to the second die, wherein the protocol layer is to implement the particular interconnect protocol and the particular interconnect protocol defines a particular data format;

converting the data from the particular data format to a flit format defined for use on the D2D link to generate adapted data based on the particular operational mode, wherein the flit format corresponds to the particular operational mode and is selected from a plurality of different flit formats supported by the D2D link based on the particular operation mode; and passing the adapted data from the protocol layer to an adapter block of the first die, wherein the adapter block is positioned between the protocol layer and a physical layer (PHY) block of the first die, wherein the PHY block is to implement a physical layer of the D2D link.

15. The method of claim 14, wherein the flit format comprises a set of reserved fields to replace fields defined in the particular interconnect protocol, and the adapter block is complete the set of reserved fields before forwarding the adapted data to the PHY block.

16. The method of claim 15, further comprising sending the adapted data with the completed set of reserved fields to the second die over the D2D link.

17. A system comprising:

a first die; and a second die coupled to the first die by a die-to-die (D2D) link, wherein the second die comprises a port to connect the second die to the D2D link, and the port comprises:

protocol layer logic to implement a particular interconnect protocol, wherein the particular interconnect protocol defines a particular data format;

die-to-die adapter circuitry; and physical layer circuitry, wherein the die-to-die adapter is positioned between the protocol layer logic and the physical layer circuitry to implement a protocol stack for the D2D link, and the protocol logic is executable to:

receive an indication that a particular one of a plurality of different operational modes is to be utilized for the particular interconnect protocol on the D2D link, wherein a plurality of flit formats are defined to correspond to the plurality of different operational modes;

generate data to be sent on the D2D link based on the particular operational mode, wherein the data is generated to adapt the particular data format to a particular flit format in the plurality of flit formats defined for use on the D2D link in the particular operational mode, wherein the particular flit format comprises a set of reserved fields to replace fields defined in the particular data format; and send the data in the particular flit format to the die-to-die adapter circuitry, wherein the die-to-die adapter circuitry is to populate the set of reserved fields with additional data to generate flit data according to the particular flit format, and the physical layer circuitry is to transmit the flit data over the D2D link to the first die.

18. The system of claim 17, wherein the first die comprises a processor device, and the second die comprises one of another processor device, a hardware accelerator, or an input/output (I/O) device.

19. The system of claim 17, wherein the first die and the second die are on a same package.

20. The system of claim 17, wherein the first die comprises a first retimer, the second die comprises a second retimer, the first die and the second die are on separate packages, and the D2D link implements an off-package interconnect.

* * * * *